US008630602B2

(12) United States Patent
Attar et al.

(10) Patent No.: US 8,630,602 B2
(45) Date of Patent: Jan. 14, 2014

(54) PILOT INTERFERENCE CANCELLATION

(75) Inventors: Rashid Ahmed A. Attar, San Diego, CA (US); Yu-Cheun Jou, San Diego, CA (US); Peter J. Black, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 12/484,572

(22) Filed: Jun. 15, 2009

(65) Prior Publication Data

US 2009/0252201 A1 Oct. 8, 2009

Related U.S. Application Data

(63) Continuation-in-part of application No. 11/334,977, filed on Jan. 18, 2006.

(60) Provisional application No. 60/713,517, filed on Aug. 31, 2005, provisional application No. 60/713,549, filed on Aug. 31, 2005, provisional application No. 60/710,370, filed on Aug. 22, 2005, provisional application No. 60/710,405, filed on Aug. 22, 2005.

(51) Int. Cl.
*H04B 1/10* (2006.01)
(52) U.S. Cl.
USPC ................ 455/296; 375/148; 370/335; 455/1
(58) Field of Classification Search
USPC .......... 455/442, 296, 63.1, 114.2, 1; 375/147, 375/148, 144, 346
See application file for complete search history.

(56) References Cited

U.S. PATENT DOCUMENTS

| 4,718,066 A | 1/1988 | Rogard |
| 4,885,744 A | 12/1989 | Lespagnol et al. |
| 5,710,784 A | 1/1998 | Kindred et al. |
| 5,751,725 A | 5/1998 | Chen |
| 5,774,450 A | 6/1998 | Harada et al. |
| 5,774,496 A | 6/1998 | Butler et al. |
| 5,960,361 A | 9/1999 | Chen |
| 5,983,383 A | 11/1999 | Wolf |

(Continued)

FOREIGN PATENT DOCUMENTS

| CN | 1347604 A | 5/2002 |
| CN | 1394407 A | 1/2003 |

(Continued)

OTHER PUBLICATIONS

International Search Report and Written Opinion—PCT/US2010/038720, International Search Authority—European Patent Office—Sep. 10, 2010.

(Continued)

*Primary Examiner* — Kamran Afshar
*Assistant Examiner* — Khawar Iqbal

(57) ABSTRACT

Techniques for generalized pilot interference cancellation in a communications receiver. In an exemplary embodiment, a residual pilot is cancelled from a post-traffic cancellation signal following initial first-pass pilot cancellation. Residual pilot cancellation is achieved by adding the first-pass cancelled pilot as earlier stored in memory back to the post-traffic cancellation signal, and pilot filtering the resulting signal to generate an improved pilot interference estimate. In an alternative exemplary embodiment, an arbitrary number of iterations may be applied to generate the pilot interference estimate by successively storing each generated pilot interference estimate in memory.

20 Claims, 16 Drawing Sheets

(56) References Cited

U.S. PATENT DOCUMENTS

| | | | |
|---|---|---|---|
| 6,108,373 A | 8/2000 | Fargues et al. | |
| 6,169,759 B1 | 1/2001 | Kanterakis et al. | |
| 6,282,233 B1 | 8/2001 | Yoshida | |
| 6,285,682 B1 | 9/2001 | Proctor et al. | |
| 6,396,867 B1 | 5/2002 | Tiedemann, Jr. et al. | |
| 6,532,254 B1* | 3/2003 | Jokinen | 375/148 |
| 6,545,989 B1 | 4/2003 | Butler | |
| 6,553,224 B1 | 4/2003 | Kim | |
| 6,633,601 B1 | 10/2003 | Yang | |
| 6,741,661 B2 | 5/2004 | Wheatley, III | |
| 6,747,963 B1 | 6/2004 | Park et al. | |
| 6,765,531 B2 | 7/2004 | Anderson | |
| 6,771,934 B2 | 8/2004 | Demers et al. | |
| 6,917,607 B1 | 7/2005 | Yeom et al. | |
| 6,956,893 B2* | 10/2005 | Frank et al. | 375/147 |
| 6,975,604 B1 | 12/2005 | Ishida et al. | |
| 6,977,888 B1 | 12/2005 | Frenger et al. | |
| 7,006,439 B2 | 2/2006 | Thron et al. | |
| 7,006,795 B2 | 2/2006 | Foschini et al. | |
| 7,031,742 B2 | 4/2006 | Chen et al. | |
| 7,042,869 B1 | 5/2006 | Bender | |
| 7,130,365 B2 | 10/2006 | Li | |
| 7,167,502 B1 | 1/2007 | Tsaur | |
| 7,224,962 B1 | 5/2007 | Kite | |
| 7,302,009 B2 | 11/2007 | Walton et al. | |
| 7,349,379 B2* | 3/2008 | Schmidl et al. | 370/342 |
| 7,466,666 B2 | 12/2008 | Yoon et al. | |
| 7,724,701 B2 | 5/2010 | Lundby et al. | |
| 8,442,441 B2 | 5/2013 | Pfister et al. | |
| 2001/0018650 A1 | 8/2001 | DeJaco | |
| 2002/0006138 A1 | 1/2002 | Odenwalder | |
| 2002/0046379 A1 | 4/2002 | Miki et al. | |
| 2002/0071407 A1 | 6/2002 | Koo et al. | |
| 2002/0093937 A1 | 7/2002 | Kim et al. | |
| 2002/0131381 A1 | 9/2002 | Kim et al. | |
| 2002/0131532 A1 | 9/2002 | Chi et al. | |
| 2003/0004784 A1 | 1/2003 | Li et al. | |
| 2003/0041206 A1 | 2/2003 | Dickie | |
| 2003/0103470 A1 | 6/2003 | Yafuso | |
| 2003/0125037 A1 | 7/2003 | Bae et al. | |
| 2003/0134656 A1 | 7/2003 | Chang et al. | |
| 2003/0199290 A1 | 10/2003 | Viertola | |
| 2003/0212816 A1 | 11/2003 | Bender et al. | |
| 2003/0223396 A1 | 12/2003 | Tsai et al. | |
| 2004/0005897 A1 | 1/2004 | Tomoe et al. | |
| 2004/0081124 A1 | 4/2004 | Black et al. | |
| 2004/0081195 A1 | 4/2004 | El-Maleh et al. | |
| 2004/0085917 A1* | 5/2004 | Fitton et al. | 370/292 |
| 2004/0085936 A1 | 5/2004 | Gopalakrishnan et al. | |
| 2004/0131007 A1 | 7/2004 | Smee et al. | |
| 2004/0141525 A1 | 7/2004 | Bhushan et al. | |
| 2004/0157614 A1 | 8/2004 | Fujita et al. | |
| 2004/0160933 A1 | 8/2004 | Odenwalder et al. | |
| 2004/0198404 A1 | 10/2004 | Attar et al. | |
| 2004/0223507 A1 | 11/2004 | Kuchibhotla et al. | |
| 2004/0229615 A1 | 11/2004 | Agrawal | |
| 2004/0240400 A1 | 12/2004 | Khan | |
| 2004/0240416 A1 | 12/2004 | Derryberry et al. | |
| 2005/0013263 A1 | 1/2005 | Kim et al. | |
| 2005/0018614 A1 | 1/2005 | Kiran | |
| 2005/0037718 A1 | 2/2005 | Kim et al. | |
| 2005/0058154 A1 | 3/2005 | Lee et al. | |
| 2005/0185364 A1 | 8/2005 | Bell et al. | |
| 2005/0265399 A1 | 12/2005 | El-Maleh et al. | |
| 2006/0050666 A1 | 3/2006 | Odenwalder | |
| 2006/0126844 A1 | 6/2006 | Mauro | |
| 2006/0141933 A1 | 6/2006 | Smee et al. | |
| 2006/0142038 A1 | 6/2006 | Ozarow et al. | |
| 2006/0209783 A1 | 9/2006 | Jain et al. | |
| 2006/0209902 A1 | 9/2006 | Grilli et al. | |
| 2007/0021148 A1 | 1/2007 | Mahini | |
| 2007/0040704 A1 | 2/2007 | Smee et al. | |
| 2007/0050189 A1 | 3/2007 | Cruz-Zeno et al. | |
| 2007/0086513 A1 | 4/2007 | Fernandez-Corbaton et al. | |
| 2007/0110095 A1 | 5/2007 | Attar et al. | |
| 2007/0112564 A1 | 5/2007 | Jelinek | |
| 2007/0121554 A1* | 5/2007 | Luo et al. | 370/335 |
| 2007/0133423 A1 | 6/2007 | Okumura | |
| 2007/0150787 A1 | 6/2007 | Kim et al. | |
| 2008/0019308 A1 | 1/2008 | Chuan-Lin et al. | |
| 2008/0080363 A1 | 4/2008 | Black et al. | |
| 2008/0080406 A1 | 4/2008 | Peplinski et al. | |
| 2008/0101440 A1 | 5/2008 | Lee | |
| 2009/0022098 A1 | 1/2009 | Novak et al. | |
| 2009/0109907 A1* | 4/2009 | Tsai et al. | 370/329 |
| 2009/0232052 A1 | 9/2009 | Black et al. | |
| 2009/0303968 A1 | 12/2009 | Jou et al. | |
| 2009/0303976 A1 | 12/2009 | Jou et al. | |
| 2009/0304024 A1 | 12/2009 | Jou et al. | |
| 2010/0061496 A1 | 3/2010 | Black et al. | |
| 2010/0097955 A1 | 4/2010 | Jou | |
| 2010/0142479 A1 | 6/2010 | Black et al. | |
| 2011/0264976 A1 | 10/2011 | Yang et al. | |
| 2012/0243515 A1 | 9/2012 | Xue et al. | |
| 2012/0281675 A1 | 11/2012 | Liang et al. | |

FOREIGN PATENT DOCUMENTS

| | | |
|---|---|---|
| CN | 1447549 A | 10/2003 |
| CN | 1552133 A | 12/2004 |
| CN | 1726657 A | 1/2006 |
| CN | 1758563 A | 4/2006 |
| CN | 1983913 A | 6/2007 |
| CN | 101465689 A | 6/2009 |
| CN | 101483499 A | 7/2009 |
| CN | 1891002 A | 10/2010 |
| EP | 1168703 A2 | 1/2002 |
| EP | 1199833 A2 | 4/2002 |
| EP | 1398984 A1 | 3/2004 |
| EP | 1643737 A1 | 4/2006 |
| EP | 1677433 A1 | 7/2006 |
| EP | 1701565 A1 | 9/2006 |
| EP | 1703659 A2 | 9/2006 |
| EP | 1821497 A1 | 8/2007 |
| GB | 2337417 | 11/1999 |
| JP | 62239735 A | 10/1987 |
| JP | 10500811 | 1/1998 |
| JP | 2001036964 A | 2/2001 |
| JP | 2001078252 | 3/2001 |
| JP | 2001511963 A | 8/2001 |
| JP | 2001519113 | 10/2001 |
| JP | 2002009741 A | 1/2002 |
| JP | 2002506583 | 2/2002 |
| JP | 2002532008 T | 9/2002 |
| JP | 2002353824 | 12/2002 |
| JP | 2003518344 A | 6/2003 |
| JP | 2004502323 | 1/2004 |
| JP | 2004512733 A | 4/2004 |
| JP | 2004194288 A | 7/2004 |
| JP | 2004531975 | 10/2004 |
| JP | 2004343754 A | 12/2004 |
| JP | 2005517343 | 6/2005 |
| JP | 2006501707 | 1/2006 |
| JP | 2006502622 A | 1/2006 |
| JP | 2006180266 A | 7/2006 |
| JP | 2006191582 A | 7/2006 |
| JP | 2007503169 A | 2/2007 |
| JP | 2007524269 A | 8/2007 |
| JP | 2007525103 A | 8/2007 |
| JP | 2008526136 A | 7/2008 |
| JP | 2008199493 A | 8/2008 |
| JP | 2008539664 A | 11/2008 |
| JP | 2009504097 A | 1/2009 |
| JP | 4643656 | 12/2010 |
| JP | 2005538650 | 12/2010 |
| KR | 20000052668 A | 8/2000 |
| KR | 20000071672 A | 11/2000 |
| KR | 20020092136 | 12/2002 |
| KR | 20030059528 A | 7/2003 |
| KR | 20040097893 A | 11/2004 |
| KR | 20040108813 | 12/2004 |
| KR | 20050073113 A | 7/2005 |

(56) References Cited

FOREIGN PATENT DOCUMENTS

| | | |
|---|---|---|
| KR | 20070091214 A | 9/2007 |
| KR | 20070104633 A | 10/2007 |
| KR | 20080031502 A | 4/2008 |
| KR | 20080039772 A | 5/2008 |
| RU | 2233045 C2 | 7/2004 |
| RU | 2252487 C2 | 5/2005 |
| RU | 2323529 C2 | 4/2008 |
| WO | WO9526593 | 10/1995 |
| WO | 9832231 A1 | 7/1998 |
| WO | WO9857452 A1 | 12/1998 |
| WO | 9923844 | 5/1999 |
| WO | 9929048 | 6/1999 |
| WO | WO0033528 A1 | 6/2000 |
| WO | WO0035126 | 6/2000 |
| WO | WO0062456 | 10/2000 |
| WO | 0108324 | 2/2001 |
| WO | 0117158 | 3/2001 |
| WO | WO0223792 A1 | 3/2002 |
| WO | 0233877 A1 | 4/2002 |
| WO | WO02103920 A2 | 12/2002 |
| WO | 03001834 A1 | 1/2003 |
| WO | 03067783 | 8/2003 |
| WO | WO03105370 A1 | 12/2003 |
| WO | WO2004025986 A2 | 3/2004 |
| WO | 2004032369 A2 | 4/2004 |
| WO | 2004114582 A1 | 12/2004 |
| WO | 2005020464 A1 | 3/2005 |
| WO | 2005034383 A2 | 4/2005 |
| WO | 2006072088 A1 | 7/2006 |
| WO | WO2006071761 A1 | 7/2006 |
| WO | 2006115979 A1 | 11/2006 |
| WO | WO2007016553 | 2/2007 |
| WO | 2008027192 A2 | 3/2008 |
| WO | WO2008156061 A1 | 12/2008 |

OTHER PUBLICATIONS

Taiwanese Search report—095130863—TIPO—Jul. 6, 2010.
International Search Report—PCT/US2010/049702—ISA/EPO—Mar. 17, 2011.
International Search Report & Written Opinion—PCT/US2009/046717, International Search Authority—European Patent Office—Oct. 7, 2009.
International Search Report & Written Opinion—PCT/US2009/046720, International Search Authority—European Patent Office—Nov. 27, 2009.
International Search Report and Written Opinion—PCT/US2009/034637, International Search Authority—European Patent Office—Jul. 14, 2009.
International Search Report and Written Opinion—PCT/US2009/060383, International Search Authority—European Patent Office—Mar. 29, 2010.
Partial International Search Report and Written Opinion—PCT/US2010/049690, International Search Authority—European Patent Office—Mar. 11, 2011.
3rd Generation Partnership, Project 2 "3GPP2" Physical Layer Standard for cdma2000,Spread Spectrum Systems. Revision D, 3GPP2 C.S0002-D, Version 2.0, Sep. 30, 2005 (538 pages).
Chen, B.Y., et al., "Using H.264 Coded Block Patterns for Fast Inter-Mode Selection" Multimedia and Expo, 2008 IEEE International Conference on, IEEE, Piscataway, NJ, USA, Jun. 23, 2008, pp. 721-724, XP031312823 ISBN: 978-1-4244-2570-9.
JVT: "Draft ITU-T Recommendation and Final Draft International Standard of Joint Video Specification (ITU-T Rec. H .264 ISO/IEC 14496- 10 AVC)", 7. JVT Meeting; 64. MPEG Meeting; Mar. 7, 2003-Mar. 14, 2003; Pattaya, TH; (Joint Video Team of ISO/IEC JTC1/SC29/WG11 and ITU-T 56.16 ), No. JVT-G050r1, Mar. 14, 2003, XP030005712, ISSN: 0000-0427.
Taiwan Search Report—TW099119532—TIPO—May 21, 2013.

* cited by examiner

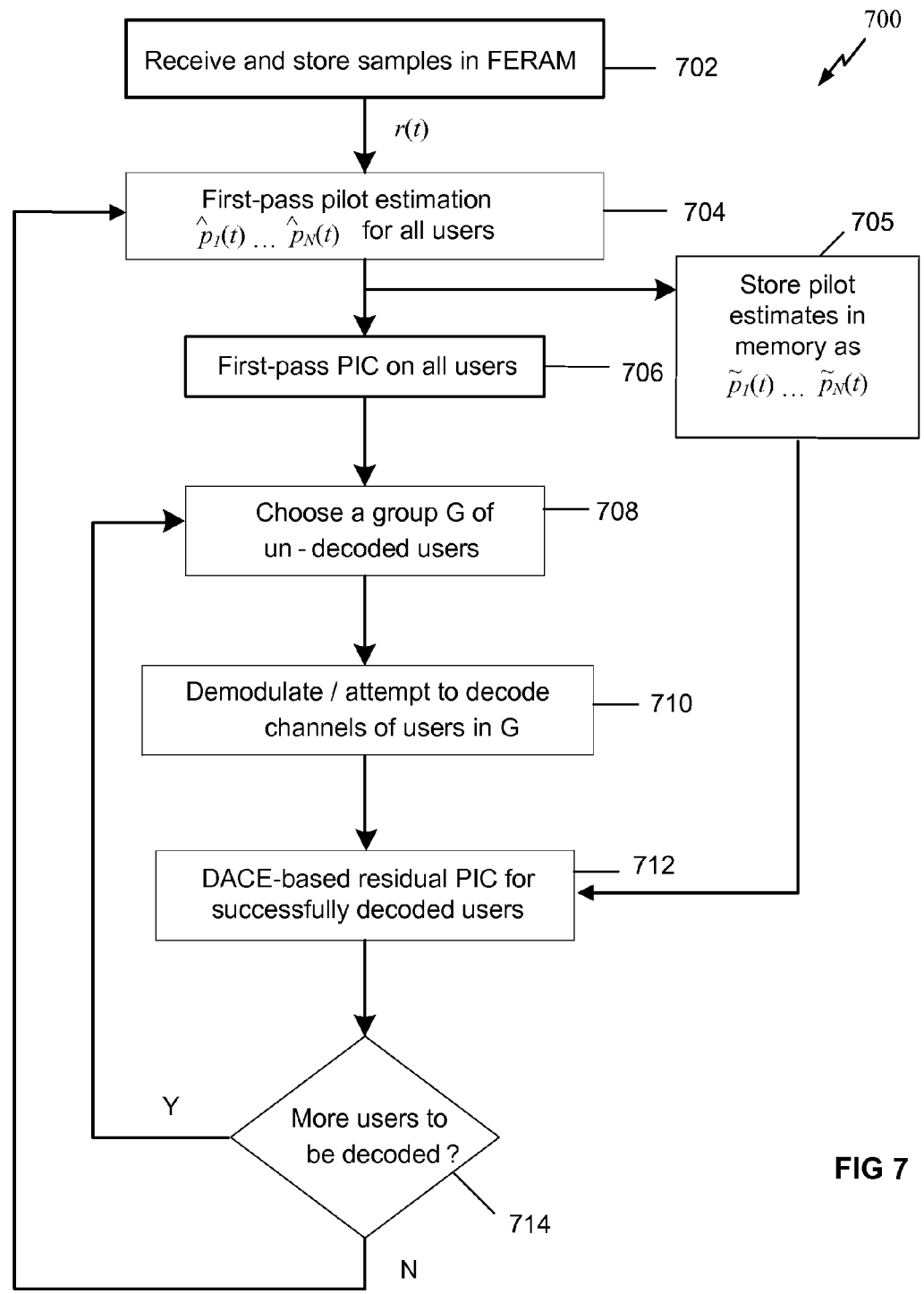

PILOT INTERFERENCE CANCELLATION

RELATED APPLICATIONS

This application is a continuation-in-part of, and claims priority to, U.S. application Ser. No. 11/334,977, entitled "Reverse Link Interference Cancellation," filed Jan. 18, 2006, which claims priority to U.S. Provisional Application Ser. No. 60/713,517, filed Aug. 31, 2005, and U.S. Provisional Application Ser. No. 60/713,549, filed Aug. 31, 2005, and U.S. Provisional Application Ser. No. 60/710,370, filed Aug. 22, 2005, and U.S. Provisional Application Ser. No. 60/710,405, filed Aug. 22, 2005, the contents of which are hereby incorporated by reference in their entirety.

TECHNICAL FIELD

The present invention relates generally to digital communications, and more specifically, to techniques for interference cancellation for communications receivers.

BACKGROUND

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques to allow multiple devices to share a common communications medium. For example, such systems can conform to standards such as Third-Generation Partnership Project 2 (3gpp2, or "cdma2000"), Third-Generation Partnership (3gpp, or "W-CDMA"), or Long Term Evolution ("LTE"). In the design of such communications systems, it is desirable to maximize the capacity, or the number of users the system can reliably support, given the available resources. One technique for increasing the capacity of a communications system is to apply interference cancellation at a receiver to maximize the received signal-to-interference-and-noise ratio (SINR) of each user. For example, in a communications system based on CDMA, a base station receiver may receive a mobile station's traffic signal in combination with interference from other mobile stations' traffic signals, as well as from all mobile stations' pilot signals. Conventional interference cancellation techniques may initially estimate and cancel interference from all users' pilot signals based on the known contents of the pilot signals, then estimate and cancel interference from other users' traffic signals as the contents of such traffic signals become known, e.g., through decoding the traffic signals.

As traffic signals are decoded, and other users' reconstructed traffic signals are cancelled from a received signal over time, it is expected that the pilot estimates may also be improved over their initial values. It would be desirable to take advantage of this to further improve the performance of communications receivers.

SUMMARY

An aspect of the present disclosure provides a method for processing a composite receive signal, the composite receive signal comprising a first channel and a second channel, the method comprising: estimating the first channel to generate a first estimate; cancelling the first estimate from the composite receive signal; decoding the second channel to generate decoded symbols; re-estimating the first channel based at least in part on the decoded symbols to generate a second estimate; and cancelling a residual estimate from the composite receive signal, the residual estimate comprising the difference between the first and second channel estimates.

Another aspect of the present disclosure provides a method for processing a composite receive signal, the composite receive signal comprising a first channel and a second channel, the method comprising: successfully decoding the second channel to generate decoded symbols; estimating the first channel based on the first channel to generate a first estimate; cancelling the first estimate from the composite receive signal prior to successfully decoding the second channel; estimating the first channel based at least in part on the decoded symbols after decoding the second channel to generate a second estimate; and cancelling the second estimate from the composite receive signal.

Yet another aspect of the present disclosure provides a method for processing a composite receive signal, the composite receive signal comprising a first channel and a second channel, the method comprising: estimating the first channel to generate a first estimate; cancelling the first estimate from the composite receive signal; decoding the second channel to generate decoded symbols; reconstructing the second channel based on the decoded symbols to generate a reconstructed second channel; cancelling the reconstructed second channel from the composite receive signal; re-estimating the first channel after the cancelling the reconstructed second channel to generate a second estimate; and cancelling a residual estimate from the composite receive signal, the residual estimate comprising the difference between the first and second channel estimates.

Yet another aspect of the present disclosure provides a method for processing a composite receive signal, the composite receive signal comprising a first channel and a second channel, the method comprising: estimating the first channel to generate a first estimate; cancelling the first estimate from the composite receive signal; decoding the second channel to generate decoded symbols; re-estimating the first channel after the cancelling the reconstructed second channel to generate a second estimate, the re-estimating based at least in part on the generated decoded symbols; cancelling a residual estimate from the composite receive signal, the residual estimate comprising the difference between the first and second channel estimates; reconstructing the second channel based on the decoded symbols to generate a reconstructed second channel; and cancelling the reconstructed second channel from the composite receive signal.

Yet another aspect of the present disclosure provides an apparatus for processing a composite receive signal, the composite receive signal comprising a first channel and a second channel, the apparatus comprising: a decoder configured to early decode the second channel to generate decoded symbols; a channel estimator configured to estimate the first channel based on the first channel to generate a first estimate, the channel estimator further configured to estimate the first channel based at least in part on successfully decoded symbols of the second channel to generate a second estimate; and a canceller configured to cancel the first estimate from the composite receive signal prior to successfully decoding the second channel, and to cancel the second estimate from the composite receive signal after successfully decoding the second channel.

Yet another aspect of the present disclosure provides an apparatus for processing a composite receive signal, the composite receive signal comprising a first channel and a second channel, the apparatus comprising: means for early decoding the second channel to generate decoded symbols; means for estimating the first channel based on successfully decoded symbols of the second channel to generate a first channel estimate; and means for cancelling the first channel estimate from the composite receive signal after successfully decoding the second channel.

Yet another aspect of the present disclosure provides a computer-readable storage medium storing instructions for causing a computer to successfully decode the second channel to generate decoded symbols; estimate the first channel to generate a first estimate; cancel the first estimate from the composite receive signal prior to successfully decoding the second channel; estimate the first channel based at least in part on the decoded symbols after decoding the second channel to generate a second estimate; and cancel the second estimate from the composite receive signal.

BRIEF DESCRIPTION OF DRAWINGS

FIG. 7 illustrates a method to perform first-pass PIC and residual PIC in the receiver of FIG. 6.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Figure 1:
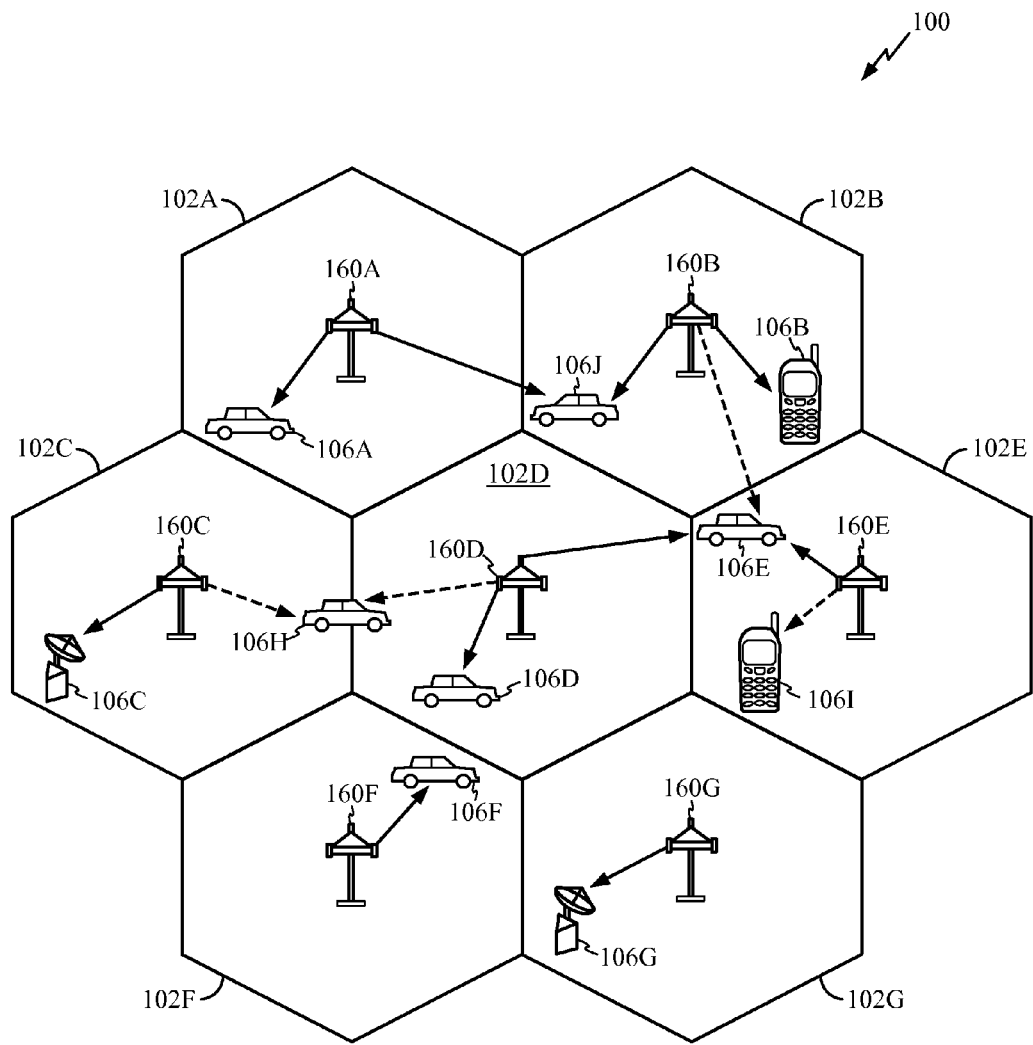
FIG. 1 illustrates a wireless cellular communications system.

Communications systems may use a single carrier frequency or multiple carrier frequencies. Referring to FIG. 1, in a wireless cellular communications system 100, reference numerals 102A to 102G refer to cells, reference numerals 160A to 160G refer to base stations, and reference numerals 106A to 106G refer to access terminals (AT's). A communications channel includes a forward link (FL) (also known as a downlink) for transmissions from a base station 160 to an access terminal (AT) 106 and a reverse link (RL) (also known as an uplink) for transmissions from an AT 106 to a base station 160. The AT 106 is also known as a remote station, a mobile station or a subscriber station. The access terminal (AT) 106 may be mobile or stationary. Each link may incorporate a different number of carrier frequencies. Furthermore, an access terminal 106 may be any data device that communicates through a wireless channel or through a wired channel, for example using fiber optic or coaxial cables. An access terminal 106 may further be any of a number of types of devices including but not limited to PC card, compact flash, external or internal modem, or wireless or wireline phone.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multiple-access techniques. The multiple-access concept is a channel allocation methodology which allows multiple user access to a common communications link. The channel allocations can take on various forms depending on the specific multiple-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

While certain exemplary embodiments of the present disclosure may be described hereinbelow for operation according to a CDMA system, one of ordinary skill in the art will appreciate that the techniques may readily be applied to other digital communications systems, such as those based on other multiple-access systems. Such alternative exemplary embodiments are contemplated to be within the scope of the present disclosure.

Figure 2:
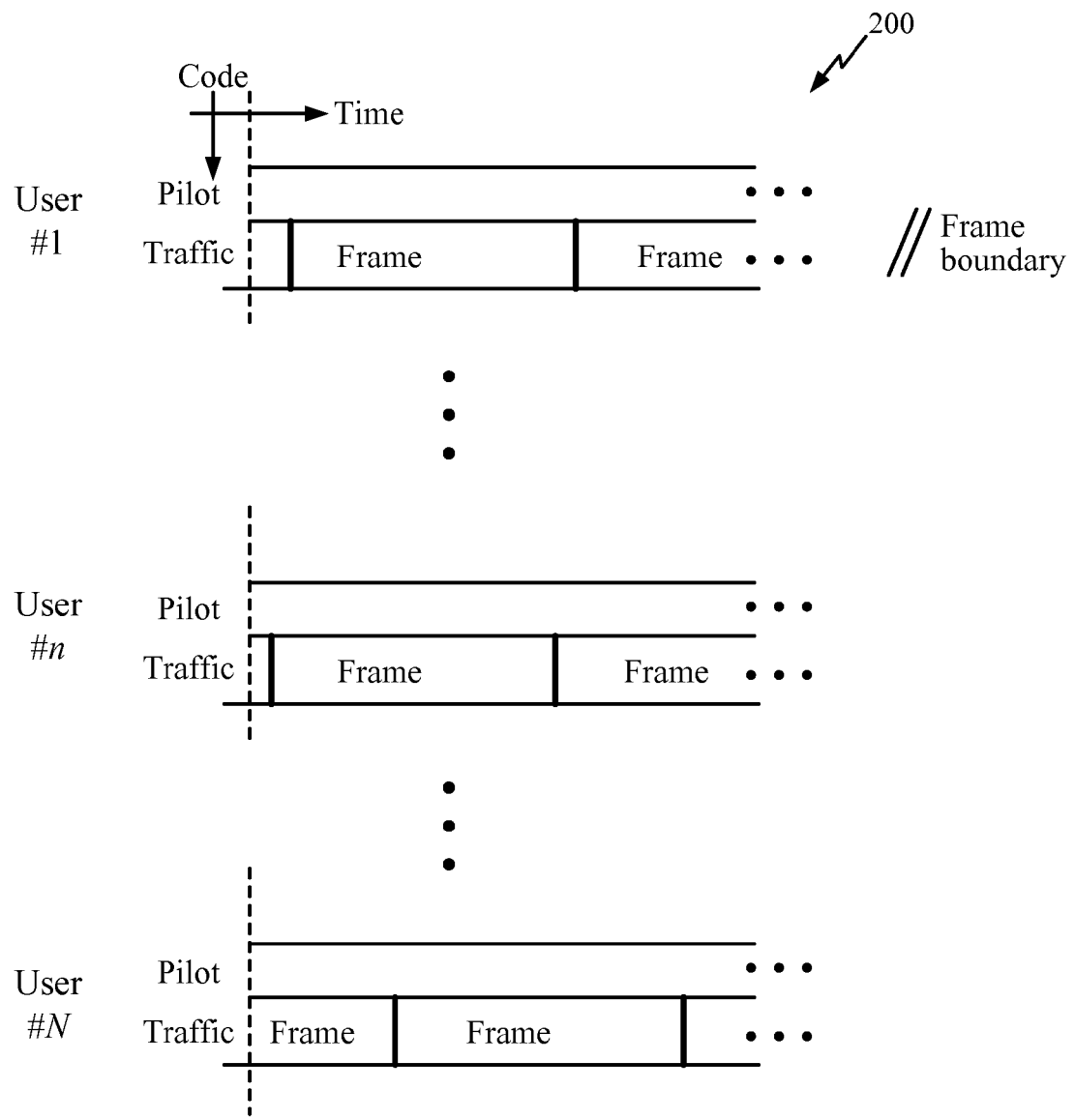
FIG. 2 illustrates example channels received at a base station on a reverse link for a CDMA communications system.

FIG. 2 illustrates example channels received at a base station on a reverse link 200 for a CDMA communications system. In FIG. 2, the vertical axis distinguishes channels based on channelization codes (e.g., Walsh and/or PN codes), while the horizontal axis represents time. Note the example channels are shown for illustrative purposes only, and are not meant to restrict the scope of the present disclosure to any particular configuration of channels shown.

In FIG. 2, signals are shown received from users #1 through #N, with an arbitrary user designated as user #n. In the implementation shown, user #n's signal includes a pilot and traffic signal, which may contain traffic data bits $d_n(t)$. The traffic for each user may be divided in time into a plurality of frames. Note in general, when received by a receiver, frame boundaries of a traffic signal for one user may not be time-aligned with the frame boundaries for other users.

Note as used in this specification and in the claims, the term "traffic" is inclusive of any channel whose data content $d_n(t)$ is not known a priori by the receiver. Thus the term "traffic" may encompass both data associated with voice traffic in cdma2000 systems, as well as data associated with "overhead channels" such as ACK messages, power control messages, etc.

In FIG. 2, the pilot for user #n is multiplexed onto a separate code from the traffic to allow the receiver to separate the pilot from the traffic. In some implementations, the pilot may be alternatively or further multiplexed using other channelization schemes, e.g., pilot and traffic may be modulated onto separate quadrature-phase (e.g., I and Q) carriers. At the receiver, the composite receive signal containing the sum of the channelized pilot and traffic signals for all users #1 through #N may be processed to recover the traffic associated with each user.

In one implementation, the receiver may implement an early decoding scheme, e.g., wherein decoding data bits $d_n(t)$ of a traffic frame for user #n is attempted prior to receiving the entire frame. Mechanisms for early decoding are further described in, e.g., U.S. patent application Ser. No. 12/252,544, entitled "Rate Determination," filed on Oct. 16, 2008, assigned to the assignee of the present invention, the disclosure of which is hereby incorporated by reference in its entirety.

Figure 3:
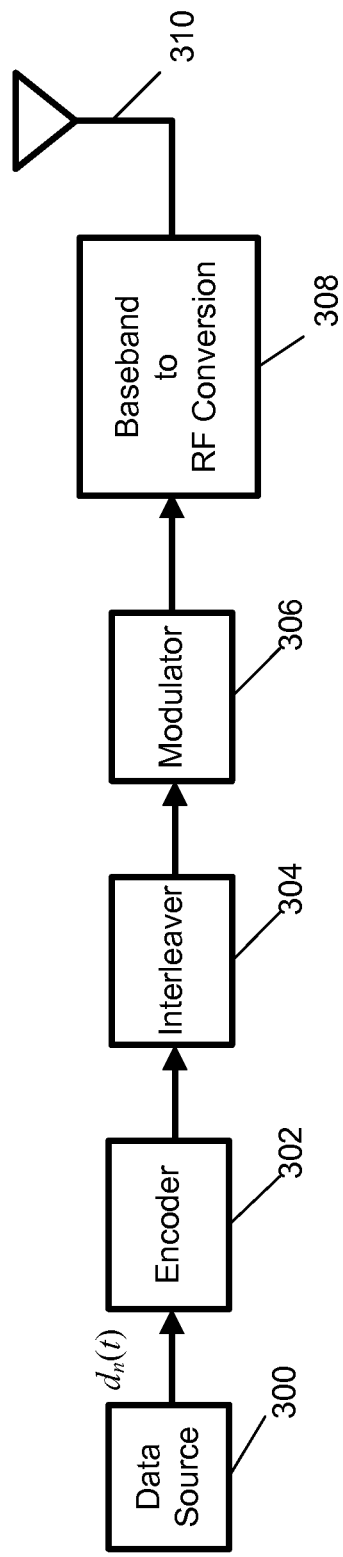
FIG. 3 illustrates an example of a transmitter structure and/or process, which may be implemented at an access terminal of FIG. 1.

FIG. 3 illustrates an example of a transmitter structure and/or process, which may be implemented at an access terminal 106 of FIG. 1 for user #n. The functions and components shown in FIG. 3 may be implemented by software, hardware, or a combination of software and hardware. Other functions may be added to FIG. 3 in addition to or instead of the functions shown in FIG. 3.

A data source 300 provides data $d_n(t)$ to an encoder 302, which encodes data bits using one or more coding schemes to provide encoded symbols. Each coding scheme may include one or more types of coding, such as cyclic redundancy check (CRC), convolutional coding, Turbo coding, block coding, other types of coding, or no coding at all. Other coding schemes may include automatic repeat request (ARQ), hybrid ARQ (H-ARQ), and incremental redundancy repeat techniques. Different types of data may be coded with different coding schemes. An interleaver 304 interleaves the coded data bits to combat fading.

A modulator 306 modulates coded, interleaved data to generate modulated data. Examples of modulation techniques include binary phase shift keying (BPSK) and quadrature phase shift keying (QPSK). The modulator 306 may also repeat a sequence of modulated data or a symbol puncture unit may puncture bits of a symbol. The modulator 306 may also spread the modulated data with a Walsh cover (i.e., Walsh code) to form a stream of chips. The modulator 306 may also use a pseudo random noise (PN) spreader to spread the stream of chips with one or more PN codes (e.g., short code, long code).

A baseband-to-radio-frequency (RF) conversion unit 308 may convert baseband signals to RF signals for transmission via an antenna 310 over a wireless communication link to one or more base stations 160.

Figure 4:
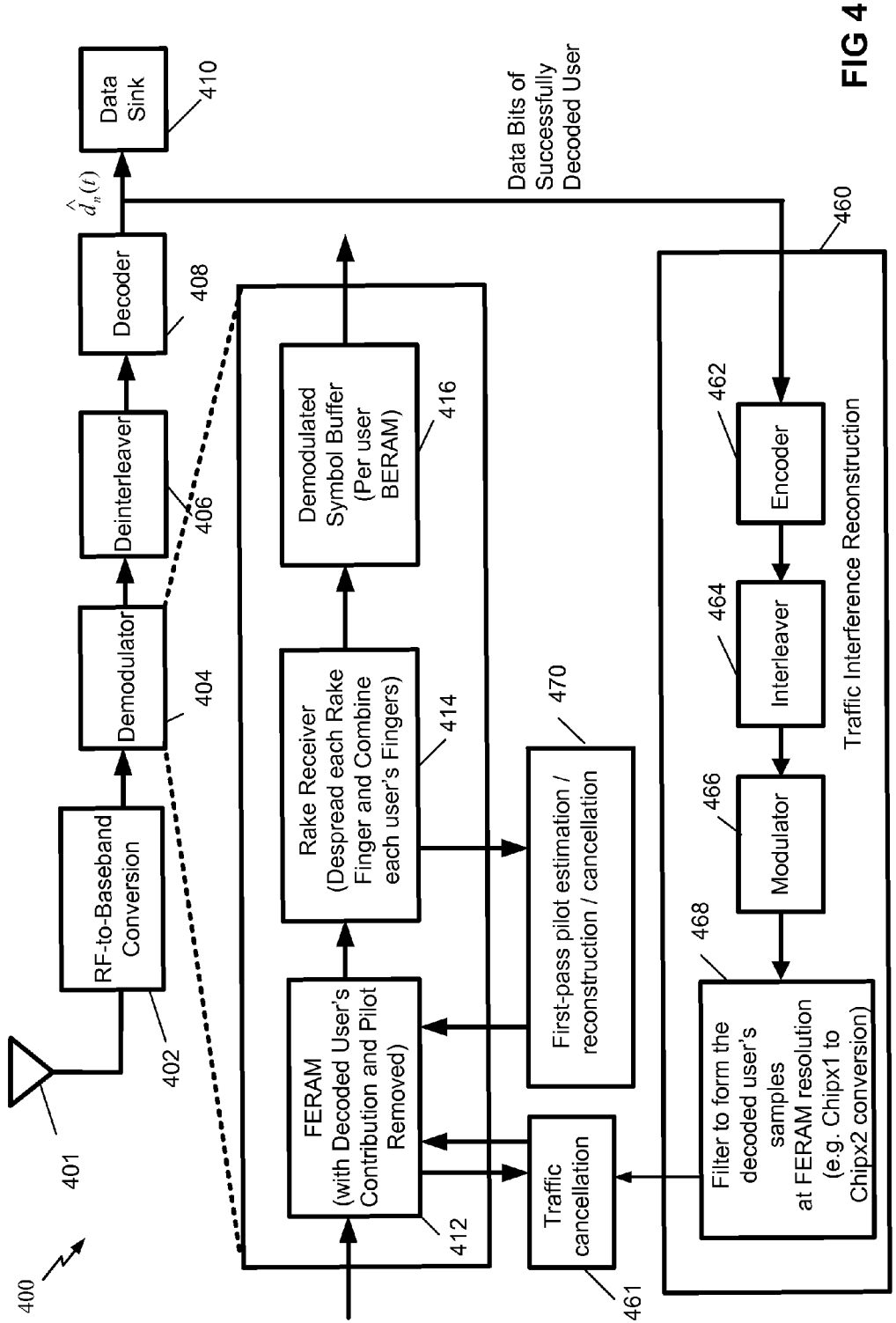
FIG. 4 illustrates an exemplary embodiment of a receiver, which may be implemented at a base station of FIG. 1.

FIG. 4 illustrates an exemplary embodiment 400 of a receiver, which may be implemented at a base station 160 of FIG. 1. The functions and components shown in FIG. 4 may be implemented by software, hardware, or a combination of software and hardware. Other functions may be added to FIG. 4 in addition to or instead of the functions shown in FIG. 4. Although interference cancellation at a base station 160 is described below, the concepts herein may be readily applied to an access terminal 106 or any other component of a communication system.

One or more antennas 401 receive the reverse link modulated signals from one or more access terminals 106. Multiple antennas may provide spatial diversity against deleterious path effects such as fading. Each received signal is provided to a respective receiver or RF-to-baseband conversion unit 402, which conditions (e.g., filters, amplifies, downconverts) and digitizes the received signal to generate digital samples.

A demodulator 404 may demodulate the received signal to provide recovered symbols. For cdma2000, demodulation tries to recover a data transmission by (1) channelizing the despread samples to isolate the received pilot and traffic onto their respective code channels, and (2) coherently demodulating the channelized traffic with a recovered pilot to provide demodulated data. Demodulator 404 may include a received sample buffer 412 (also called joint front-end RAM (FE-RAM) or sample RAM) to store samples of the composite receive signal for all users/access terminals, a Rake receiver 414 to despread and process multiple signal instances corresponding to distinct "multipaths," and a demodulated symbol buffer 416 (also called back-end RAM, BERAM, or demodulated symbol RAM). There may be a plurality of demodulated symbol buffers 416, each corresponding to a particular user/access terminal.

A deinterleaver 406 deinterleaves data from the demodulator 404.

A decoder 408 may decode the demodulated data to recover decoded data bits $\hat{d}_n(t)$ transmitted by the access terminal 106. The decoded data may be provided to a data sink 410.

In FIG. 4, decoded data bits $\hat{d}_n(t)$ of successfully decoded user #n are input to an interference reconstruction unit 460, which includes an encoder 462, interleaver 464, modulator 466 and filter 468. The encoder 462, interleaver 464, and modulator 466 may be similar to the encoder 302, interleaver 304, and modulator 306 of FIG. 3. The filter 468 forms the decoded user's samples at FERAM resolution, e.g., at 2× chip rate. In an exemplary embodiment, the gain of the filter 468 may be weighted with the channel estimate as derived from, e.g., the pilot estimation, data-augmented channel estimation, and/or other channel estimation techniques further described hereinbelow. The decoded user's contribution to the FERAM is then removed or canceled from the FERAM 412 using traffic cancellation block 461, in the process known as traffic interference cancellation (TIC).

Further description is given below of the functions of the FERAM 412 and BERAM 416 in the TIC receiver 400.

In an exemplary embodiment, the FERAM 412 and the BERAM 416 may be circular buffers. The FERAM 412 stores received samples (e.g., at 2× chip rate) and is common to all users. The BERAM 416 stores demodulated symbols of the received bits as generated by the demodulator's Rake receivers 414. Each user may have a different BERAM, since the demodulated symbols are obtained by despreading with the user-specific PN sequence, and combining across Rake fingers. In an exemplary embodiment, in the first-pass and residual PIC techniques described hereinbelow, each Rake finger may estimate its own corresponding pilot, and when the estimated pilot is subsequently cancelled from the FERAM in PIC, it may be cancelled using the offset of the corresponding Rake finger that derived that estimated pilot. Both a TIC and non-TIC receiver may use a BERAM 416. The BERAM 416 in TIC may store demodulated symbols of previous frames that are no longer stored in an FERAM 412.

As further shown in FIG. 4, a first-pass pilot estimation/reconstruction block 470 is provided. At block 470, first-pass pilot interference cancellation (PIC) may be performed on the samples in the FERAM 412, so that demodulation and decoding of each user's traffic signal may proceed without interference from the pilot signal of that user and other users.

Figure 5:
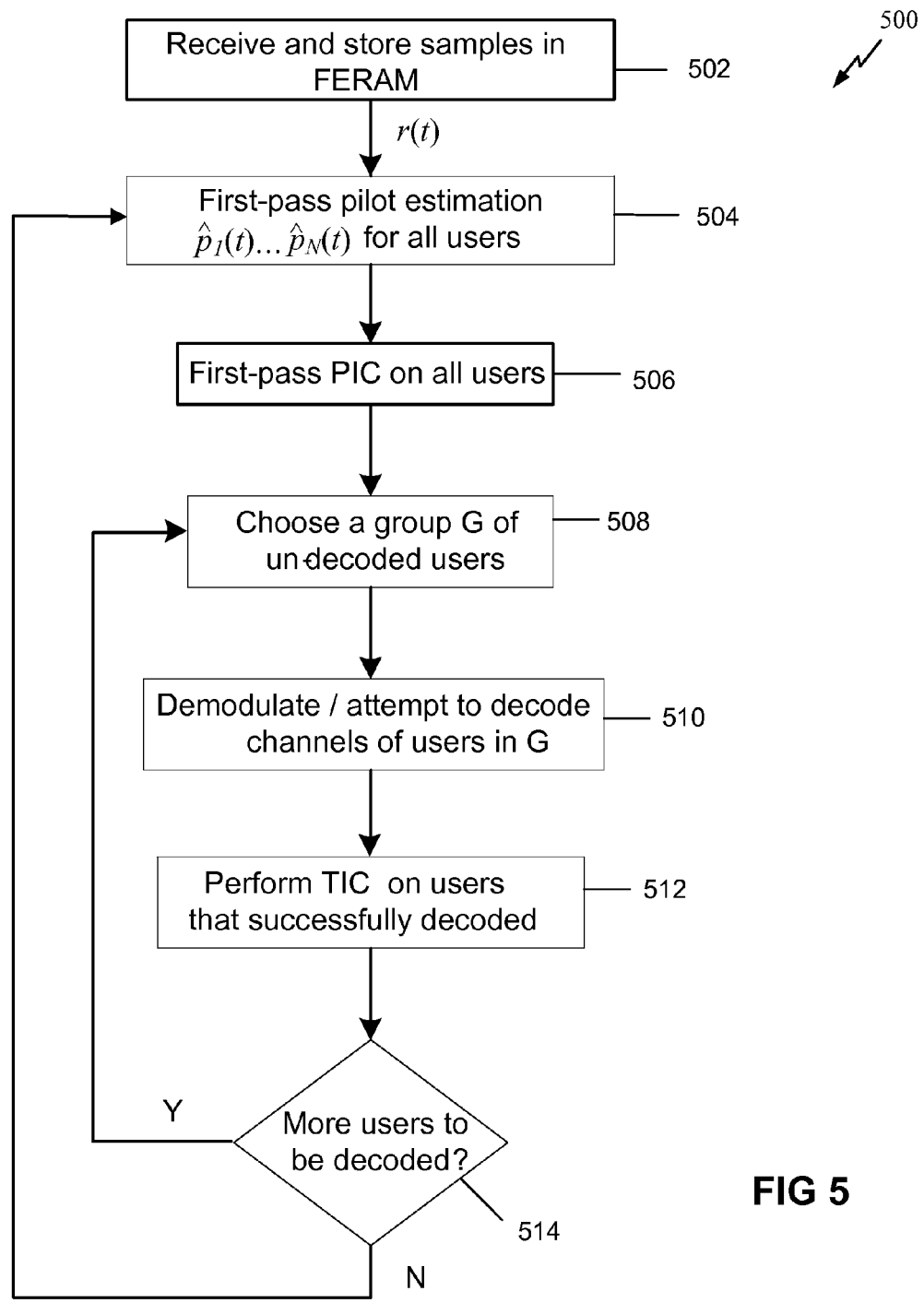
FIG. 5 illustrates a method to perform first-pass PIC followed by TIC in the receiver of FIG. 4.

FIG. 5 illustrates a method 500 to perform first-pass PIC followed by TIC in the receiver 400 of FIG. 4.

At block 502, samples are continuously received and stored into the FERAM 412. In an exemplary embodiment, samples may be written into the FERAM 412 in real time, i.e., the 2× chip rate samples may be written in every ½ chip. The stored samples in the FERAM 412 are denoted as r(t).

At block 504, the receiver performs first-pass pilot estimation for all users #1 through #N. As the pilot pattern for all users is known at the BTS, an estimate $\hat{p}_n(t)$ of the received pilot signal for each user #n may be generated by each Rake finger in the Rake receiver 414. At block 506, the pilot estimates obtained at block 504 may be reconstructed and subtracted from the samples stored in the FERAM 412.

Figure 5A:
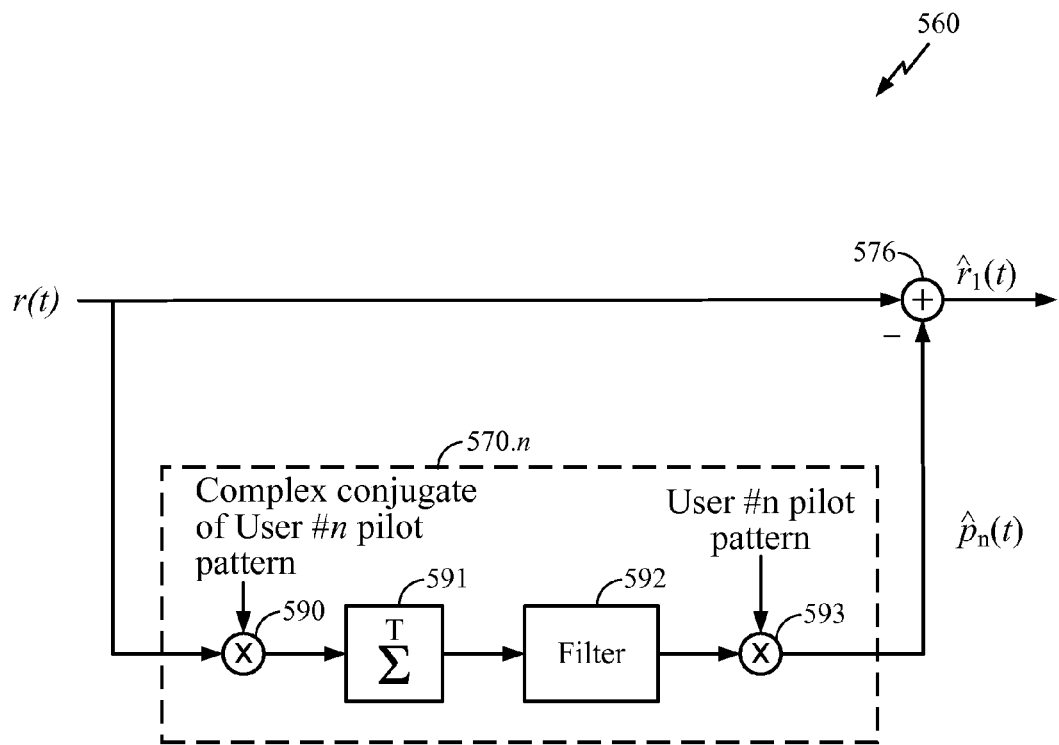
FIG. 5A illustrates an exemplary embodiment of first-pass pilot cancellation for user #n in the first-pass pilot estimation and cancellation blocks shown in FIG. 5.

FIG. 5A illustrates an exemplary embodiment 560 of first-pass pilot cancellation for user #n in the first-pass pilot estimation and cancellation blocks 504 and 506. In an exemplary embodiment, an instance of the blocks shown in 560 may be provided, e.g., in each Rake finger demodulator of Rake receiver 414 in FIG. 4, wherein a separate Rake finger is assigned to a distinct multipath associated with each user.

In FIG. 5A, r(t), or the signal stored in the FERAM 412, is coupled to a pilot n estimation block 570.n. The pilot estimation block 570.n computes an estimate $\hat{p}_n(t)$ of the pilot signal $p_n(t)$ associated with user #n, based on the known pilot pattern associated with user #n. Cancellation adder 576 subtracts $\hat{p}_n(t)$ from r(t) to generate $\hat{r}_1(t)$, also referred to herein as a first composite signal. The first composite signal $\hat{r}_1(t)$ may be stored back in the FERAM 410 as the first-pass pilot cancelled version of the received signal.

In the pilot estimation block 570.n, the signal r(t) is first correlated with user #n's pilot pattern by multiplying with a multiplier 590, and accumulating with an add-and-dump block 591. The output of block 591 may be provided to a filter 592. Note as defined herein, the "correlation" of a first signal with a second signal may cover the operations of multiplying the first signal with the complex conjugate of the second signal (or vice versa), and accumulating or filtering the result of the multiplying over a period of time.

Filter 592 may implement, for example, any type of filtering operation for improving the quality of the pilot associated with user #n, while de-emphasizing noise and other interference contributions. For example, filter 592 may include a finite-impulse response (FIR) filter, an infinite-impulse response filter (IIR), and/or a filter having non-linear and/or time-varying characteristics as derivable by one of ordinary skill in the art. The output of filter 592 may be reconstructed by "spreading," e.g., multiplying by user #n's pilot pattern, so that the output of the pilot estimation block 570.n may subsequently be further cancelled from the composite signal r(t).

Note the instance of a pilot estimation block shown in FIG. 5A is provided for illustrative purposes only. One of ordinary skill in the art will appreciate that alternative instances of the pilot estimation block shown in FIG. 5A are readily derivable by one of ordinary skill in the art, and their incorporation into a receiver along with the pilot interference cancellation techniques of the present disclosure is contemplated to be within the scope of the present disclosure.

Returning to FIG. 5, following first-pass PIC at blocks 504-506, a group G of undecoded users is chosen at block 508. In an exemplary embodiment, the group G of users may correspond to those users for whom a sufficient amount of data have been received and stored in FERAM 412. In an exemplary embodiment, G may include a single user, or it may include multiple users.

At block 510, traffic channel demodulation for users in G is performed, and decoding of traffic is attempted based on samples already received. For example, demodulator 404 demodulates samples of the chosen user group's frames for some or all time segments stored in the FERAM 412, according to the users' spreading and scrambling sequence, as well as their constellation size. Furthermore, the decoder 408 attempts to decode the users' traffic using the demodulated FERAM samples and the previously demodulated symbols stored in BERAM 416. Note when G includes multiple users, decoding of each user in G may be done in parallel with other users, or in succession.

At block 512 of FIG. 5, TIC is performed by reconstructing successfully decoded traffic data, e.g., by using traffic reconstruction block 460, and subtracting the reconstructed traffic from the FERAM 412. In an exemplary embodiment, decoding success may be determined by, e.g., checking whether a cyclic redundancy code (CRC) passes an error check.

At block 514, it is checked whether there are more users to decode. If yes, the method returns to block 508, and selects a new group G of users to decode. If no, the method returns to block 504, wherein first-pass PIC may be performed for newly received (i.e., prior to first-pass PIC) samples in the FERAM 412.

In an exemplary embodiment, e.g., wherein the group G includes multiple users, all such users in the group may be decoded together, and then their interference contributions subtracted all at once. In an alternative exemplary embodiment, e.g., wherein the group G first includes one user, and then is updated to include a next user at block 514, each user may be decoded and its traffic interference cancelled in a sequential fashion from one user to the next user through the loopback from block 514 to block 508, in a process known as successive interference cancellation (SIC). In this embodiment, users later in the decoding order benefit from the cancellations of users earlier in the decoding order of the same group.

Whenever a user or group of users is correctly decoded at block 510, its traffic interference contribution may be subtracted from the FERAM 412, thus increasing the quality of (i.e., reducing the total interference present in) the samples in the FERAM 412. Furthermore, knowledge of the decoded data associated with the user or group of users may aid in improved estimation of the channel response, which may lead to more accurate PIC by the receiver. Exemplary embodiments implementing these features are further described hereinbelow.

Figure 6:
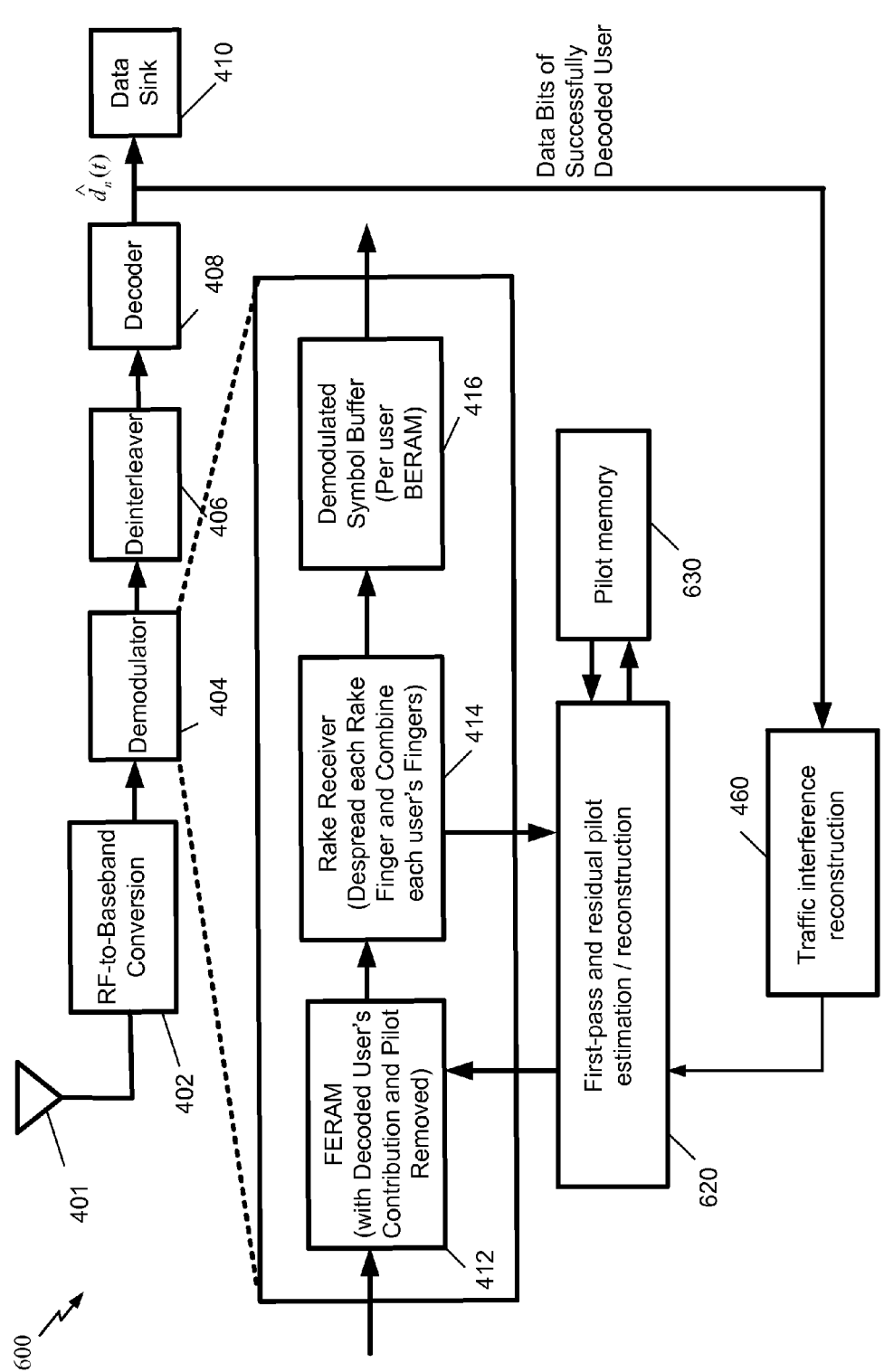
FIG. 6 illustrates an alternative exemplary embodiment of a receiver according to the present disclosure.

FIG. 6 illustrates an alternative exemplary embodiment 600 of a receiver according to the present disclosure. Similarly labeled elements in FIGS. 6 and 4 correspond to blocks having similar functionality, unless otherwise noted. In FIG. 6, a first-pass and residual pilot estimation/reconstruction block 620 is provided in place of the first-pass pilot estimation/reconstruction block 520 in FIG. 5. First-pass and residual estimation/reconstruction block 620 is coupled to a pilot memory 630 for storing pilot interference samples cancelled from the FERAM 412, for later use in residual pilot processing as further described hereinbelow. The operation of the receiver 600 may proceed as described in FIG. 7.

FIG. 7 illustrates a method 700 to perform first-pass PIC and residual PIC in the receiver 600 of FIG. 6.

At block 702, samples are continuously received and stored into the FERAM 412.

At block 704, the receiver performs first-pass pilot estimation for all users. In an exemplary embodiment, first-pass pilot estimation may proceed as described with reference to, e.g., block 504 in FIG. 5.

Following block 704, at block 705, the pilot estimates $\hat{p}_1(t)$ through $\hat{p}_N(t)$ are stored in a pilot memory, e.g., pilot memory 630 in FIG. 6, for later use in residual PIC. Pilot estimates stored in memory for user #1 through #N are also denoted $\tilde{p}_1(t)$ through $\tilde{p}_N(t)$.

At block 706, first-pass PIC is performed by subtracting the pilot estimates obtained at block 704 from the samples r(t) stored in the FERAM 412. At block 708, a group G of undecoded users is chosen.

At block 710, traffic channel demodulation is performed, and decoding of traffic for users in G is attempted based on samples already received.

At block 712, data-augmented channel estimation (DACE)-based residual PIC is performed for successfully decoded users. In DACE, the pilot pattern is augmented with the successfully decoded traffic to obtain a better estimate of the channel than possible with only the pilot pattern. DACE is achieved via coherent combining of the pilot pattern and decoded data, and may be advantageously used to increase the quality of PIC, as further described hereinbelow. Residual PIC is performed for users that successfully decoded, using the channel estimates derived from DACE. In an exemplary embodiment, residual PIC may be configured to account for the pilot estimate $\tilde{p}_n(t)$ earlier stored in the pilot memory 630 at block 705, which has already been cancelled from the samples of the FERAM 412.

At block 714, it is checked whether there are more users to decode. If yes, the method returns to block 708, and selects a new group G of users to decode. If no, the method returns to block 704, wherein first-pass PIC may be performed for newly received samples in the FERAM 412.

Figure 7A:
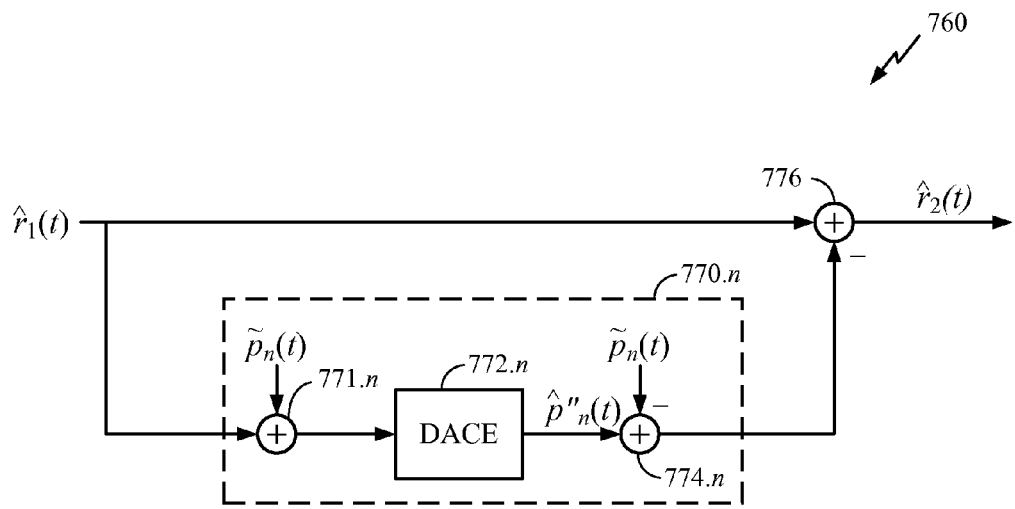
FIG. 7A illustrates an exemplary embodiment of operations performed by the DACE block and residual PIC block in FIG. 7.

FIG. 7A illustrates an exemplary embodiment 760 of operations performed by DACE-based residual PIC block 712. An instance of the blocks shown in 760 may be provided, e.g., in each Rake finger demodulator of Rake receiver 414 in FIG. 6, wherein a separate Rake finger is assigned to a distinct multipath associated with each user #n.

In FIG. 7A, $\hat{r}_1(t)$, or the signal stored in the FERAM 412 after first-pass PIC, is coupled to a channel n estimation block 770.n. In the channel estimation block 770.n, an adder 771.n first adds back to $\hat{r}_1(t)$ the pilot signal $\tilde{p}_n(t)$ for user #n, e.g., as previously stored in the pilot memory 630 at step 705. DACE block 772.n then computes an estimate $\hat{p}_n''(t)$ of the pilot signal $p_n(t)$ associated with user #n, based on the known pilot pattern, as well as successfully decoded traffic associated with user #n. The stored cancelled pilot signal $\tilde{p}_n''(t)$ is then subtracted from the output of block 772.n using cancellation adder 774.n, to derive a residual difference between the already cancelled pilot estimate $\tilde{p}_n(t)$ and the DACE-based pilot estimate $\hat{p}_n''(t)$. The output of 774.n is subtracted from the signal $\hat{r}_1(t)$ using cancellation adder 776 to generate a second composite signal $\hat{r}_2(t)$. The second composite signal $\hat{r}_2(t)$ may be written back to the FERAM 412 in place of the signal $\hat{r}_1(t)$.

Figure 7B:
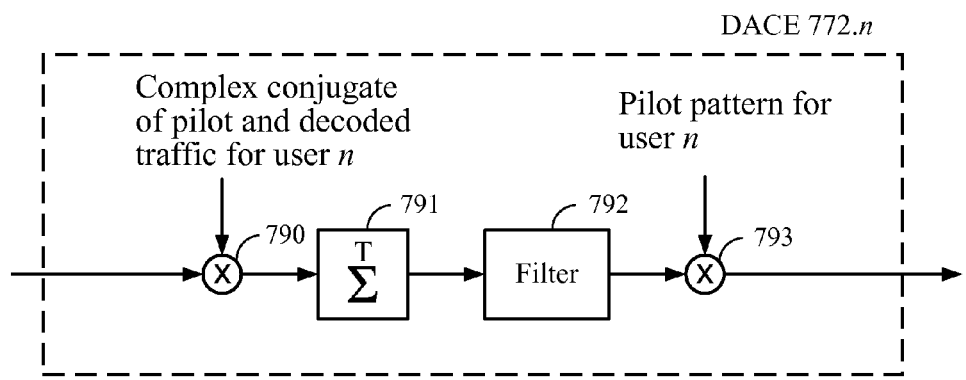
FIG. 7B illustrates exemplary operations performed by DACE block in FIG. 7A.

FIG. 7B illustrates exemplary operations performed by DACE block 772.n. In FIG. 7B, the incoming signal is correlated with the known pilot pattern, as well as the successfully decoded traffic, for user n, using multiplier 790 and add-and-dump block 791. One of ordinary skill in the art will appreciate that by correlating the incoming signal with both pilot and successfully decoded traffic data, a better estimate of the channel associated with user n may be obtained than possible with the pilot alone.

One of ordinary skill in the art will further appreciate that in alternative exemplary embodiments (not shown), the correlation performed by blocks 790 and 791 may be implemented using separate multiply-and-accumulate blocks, e.g., one multiply-and-accumulate for the complex conjugate of the pilot pattern and one multiply-and-accumulate for the complex conjugate of the successfully decoded traffic, and the results added together. In yet another exemplary embodiment, the incoming signal may instead be correlated with successfully decoded traffic data alone (without pilot), in a process known as data-based channel estimation (DBCE). Such alternative exemplary embodiments are contemplated to be within the scope of the present disclosure.

In FIG. 7B, the output of block 791 is provided to a filter 792. The output of filter 792 is used to resynthesize the pilot signal for cancellation from $\hat{r}_1(t)$ by multiplying with the pilot pattern for user n using multiplier 793.

In the method 700 of FIG. 7, as the DACE-based PIC at block 712 is performed on receive samples on which first-pass PIC has already been performed (at block 704), the PIC at block 712 is also termed "backward" or "residual" DACE-based PIC.

Figure 7C:
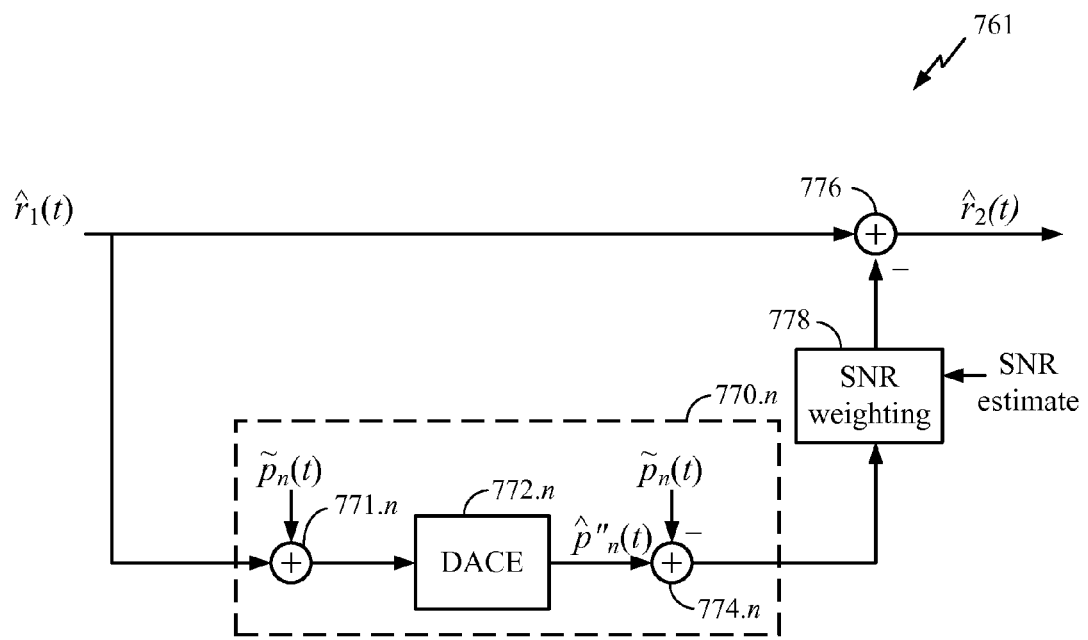
FIG. 7C illustrates an alternative exemplary embodiment of operations performed by the DACE and residual PIC block in FIG. 7.

FIG. 7C illustrates an alternative exemplary embodiment 761 of operations performed by the DACE 712 and residual PIC block 713. In FIG. 7C, an SNR weighting block 778 is provided to weight the pilot estimate (output of DACE block 770.n) prior to cancellation from the FERAM 412 by cancellation adder 776. In the exemplary embodiment shown, the pilot estimate may be scaled as a function of the SNR of the pilot estimate so as to minimize the residual cancellation error. Ideally cancellation only removes the desired signal; however, practical implementations may include estimation error which effectively adds pilot noise due to estimation errors. Scaling based on SNR can be used to minimize the mean square power of the residual cancelled pilot, trading off the cancellation of the original pilot versus addition of pilot noise due to estimation errors. One of ordinary skill in the art will appreciate that such weighting techniques may be applied to any PIC schemes described herein, and that such alternative exemplary embodiments are contemplated to be within the scope of the present disclosure.

Figure 8:
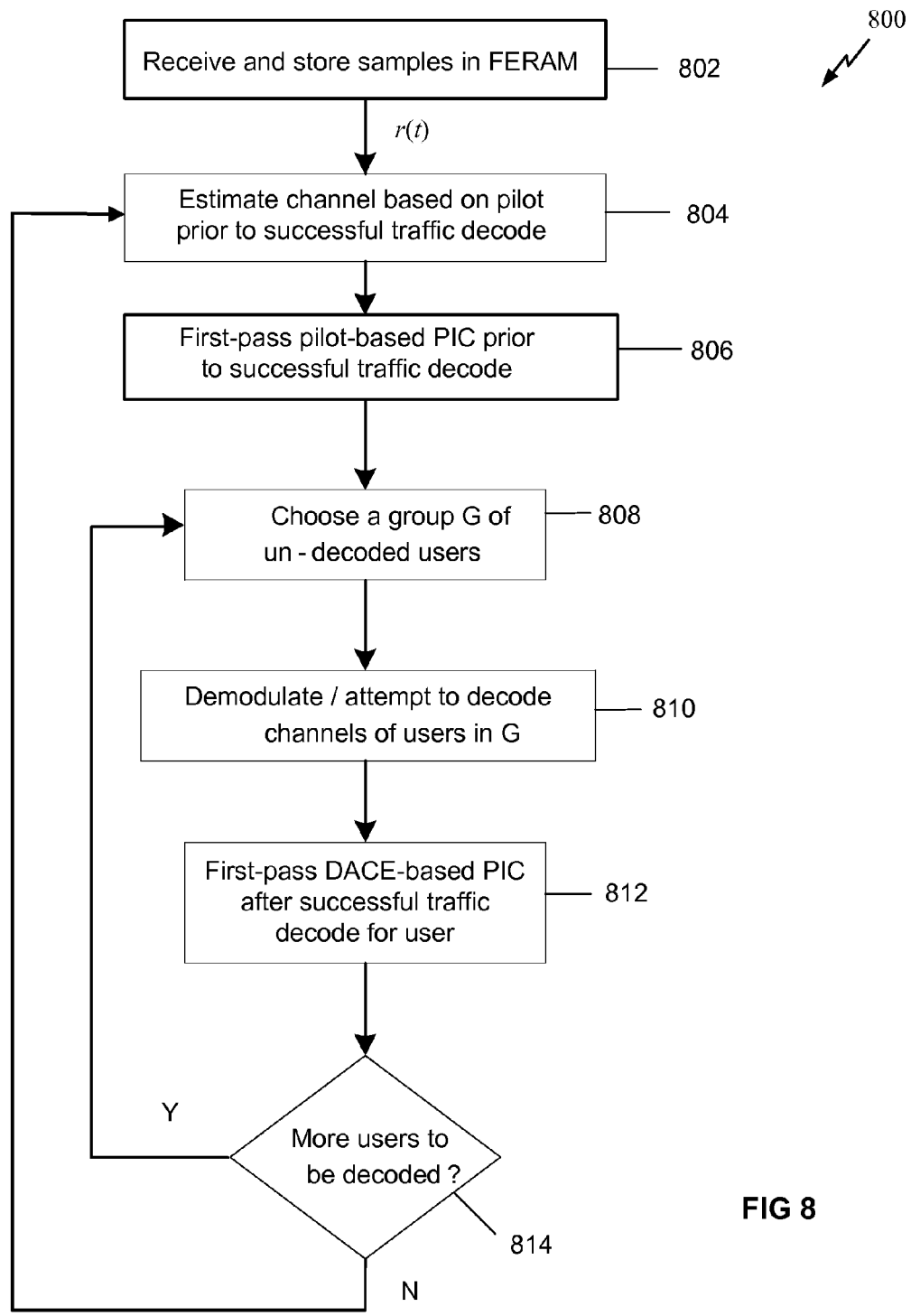
FIG. 8 illustrates a method to perform first-pass PIC using pilot (only)-based channel estimates prior to successful traffic decode, and first-pass PIC based on DACE after successful traffic decode, in the receiver of FIG. 6.

FIG. 8 illustrates a method 800 to perform first-pass PIC using pilot (only)-based channel estimates prior to successful traffic decode, and first-pass PIC based on DACE after successful traffic decode, in the receiver 600 of FIG. 6.

At block 802, samples are continuously received and stored into the FERAM 412.

At block 804, prior to successful traffic decode for a user, the channel for that user is estimated based solely on the known pilot pattern. In an exemplary embodiment, such pilot estimation may proceed as described with reference to, e.g., block 504 in FIG. 5.

At block 806, first-pass PIC is performed using the pilot-based channel estimates obtained at block 804.

At blocks 808-810, a group of users G is selected and decoded.

At block 812, data-augmented channel estimation (DACE) is performed, and the resulting channel estimates are used to perform first-pass PIC for the remainder of the frame for users having traffic successfully decoded at block 810. In an exemplary embodiment, such first-pass DACE-based PIC is performed on samples r(t) in the FERAM 412 received after the successful traffic decode, e.g., samples r(t) on which first-pass pilot-based PIC has not yet been performed. One of ordinary skill in the art will appreciate that performing DACE for on samples received after a successful traffic decode may include, e.g., re-encoding the successfully decoded symbols to generate an expected transmit pattern for the traffic signal to be received for the rest of the frame, and estimating the pilot signal for the rest of the frame by comparing the expected transmit pattern of the traffic signal, and/or the pilot signal, with the composite receive signal.

At block 814, it is checked whether there are more users to decode. If yes, the method returns to block 808, and selects a new group G of users to decode. If no, the method returns to block 804.

Figure 8A:
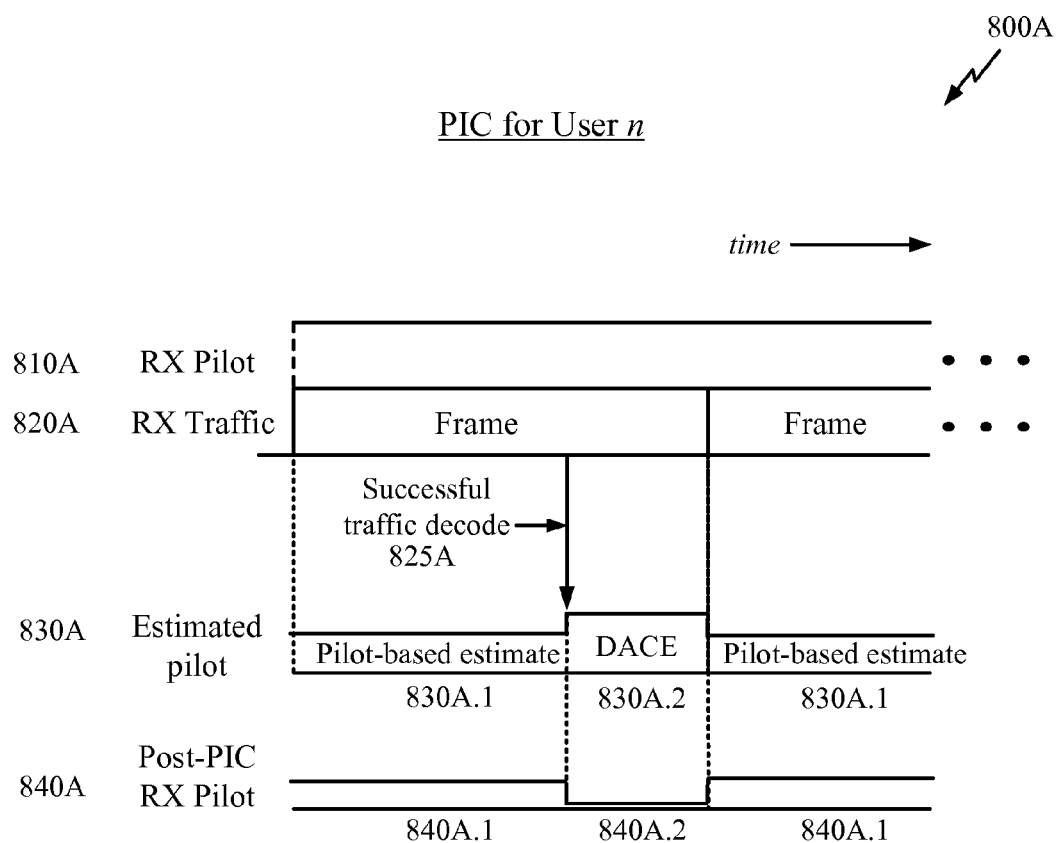
FIG. 8A illustrates a timing diagram of PIC as performed according to the method of FIG. 8 for user #n.

FIG. 8A illustrates a timing diagram 800A of PIC as performed according to the method 800 for user #n. In FIG. 8A, the horizontal axis denotes time, as shown, while the vertical axis denotes an idealized measure of the corresponding signal's power. Note the timings and signals shown are for illustrative purposes only, and are not meant to restrict the scope of the present disclosure in any way.

In FIG. 8A, an RX signal composed of RX pilot 810A and RX traffic 820A corresponding to user #n is received at a receiver. RX traffic is formatted in frames, with frame boundaries as marked. Estimated pilot 830A corresponds to the receiver's estimate of the RX pilot 810A present in the RX signal.

The first portion 830A.1 of estimated pilot 830A corresponds to the receiver's estimate of the RX pilot 810A using pilot-based estimation, as resulting, e.g., from operations done at block 804 of FIG. 8. The second portion 830A.2 of estimated pilot 830A, commencing after successful traffic decode at 825A, corresponds to the receiver's estimate of the RX pilot 810A using DACE, as resulting, e.g., from an estimation operation performed at block 812 of FIG. 8.

Post-PIC RX pilot 840A corresponds to the result of cancelling the estimated pilot 830A from the RX pilot 810A. The first portion 840A.1 of the post-PIC RX pilot 840A corresponds to cancellation using the pilot-based channel estimate, as resulting, e.g., from operations done at block 806 of FIG. 8. The second portion 840A.2 of the post-PIC RX pilot 840A corresponds to the cancellation using DACE, as resulting, e.g., from a cancellation operation performed at block 812 of FIG. 8.

In the method 800 of FIG. 8, as the DACE-based PIC at block 812 is performed on samples received after a successful traffic decode, the PIC at block 813 is also termed "forward" DACE-based PIC.

Figure 9:
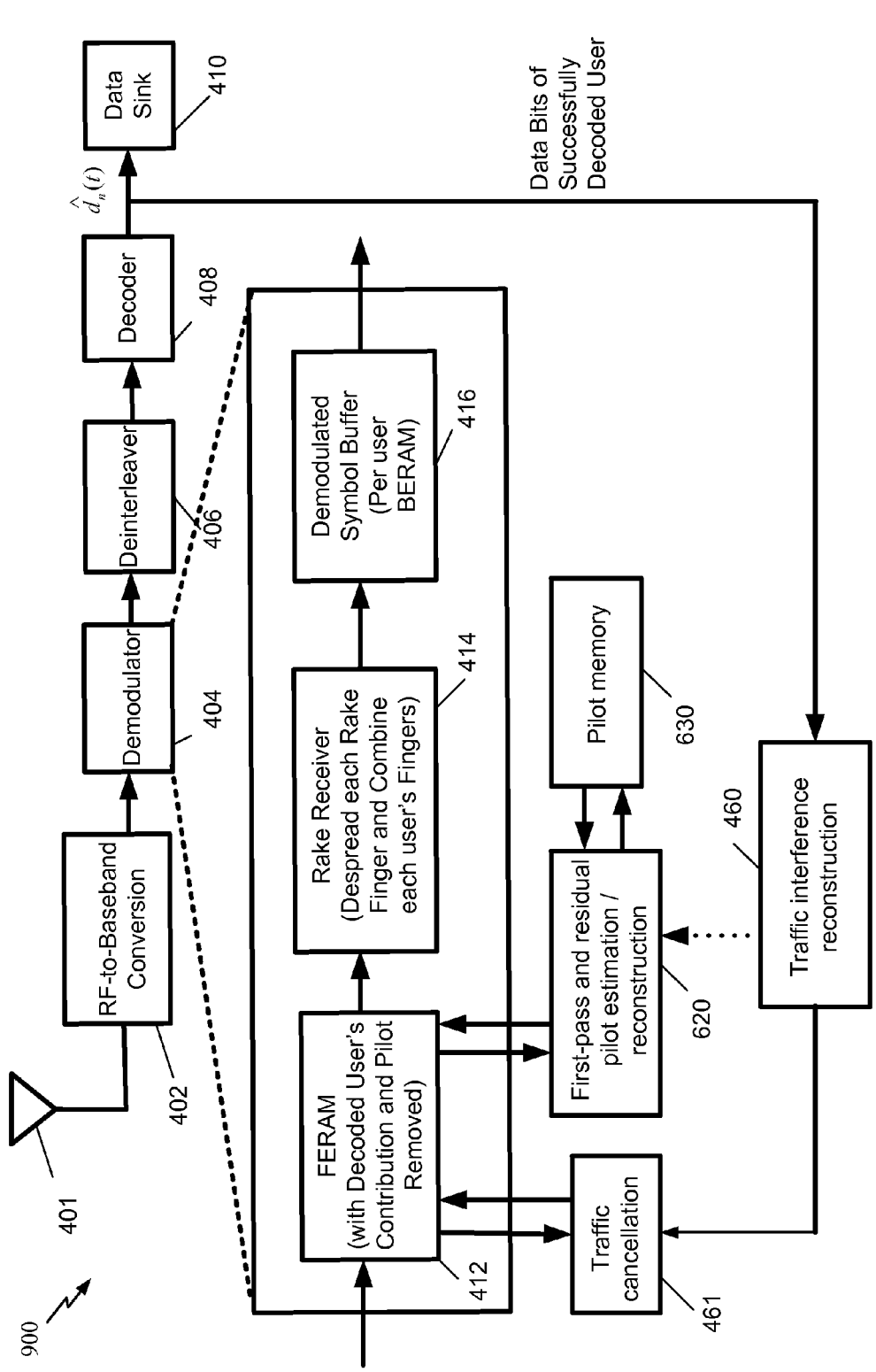
FIG. 9 illustrates an alternative exemplary embodiment of a receiver according to the present disclosure.

FIG. 9 illustrates an alternative exemplary embodiment 900 of a receiver according to the present disclosure. The receiver 900 combines the first-pass and residual pilot estimation/reconstruction block 620 with the traffic cancellation block 461 to further improve the performance of PIC. In exemplary embodiments, the operation of the receiver 900 may proceed as described in FIG. 10 or FIG. 11.

Figure 10:
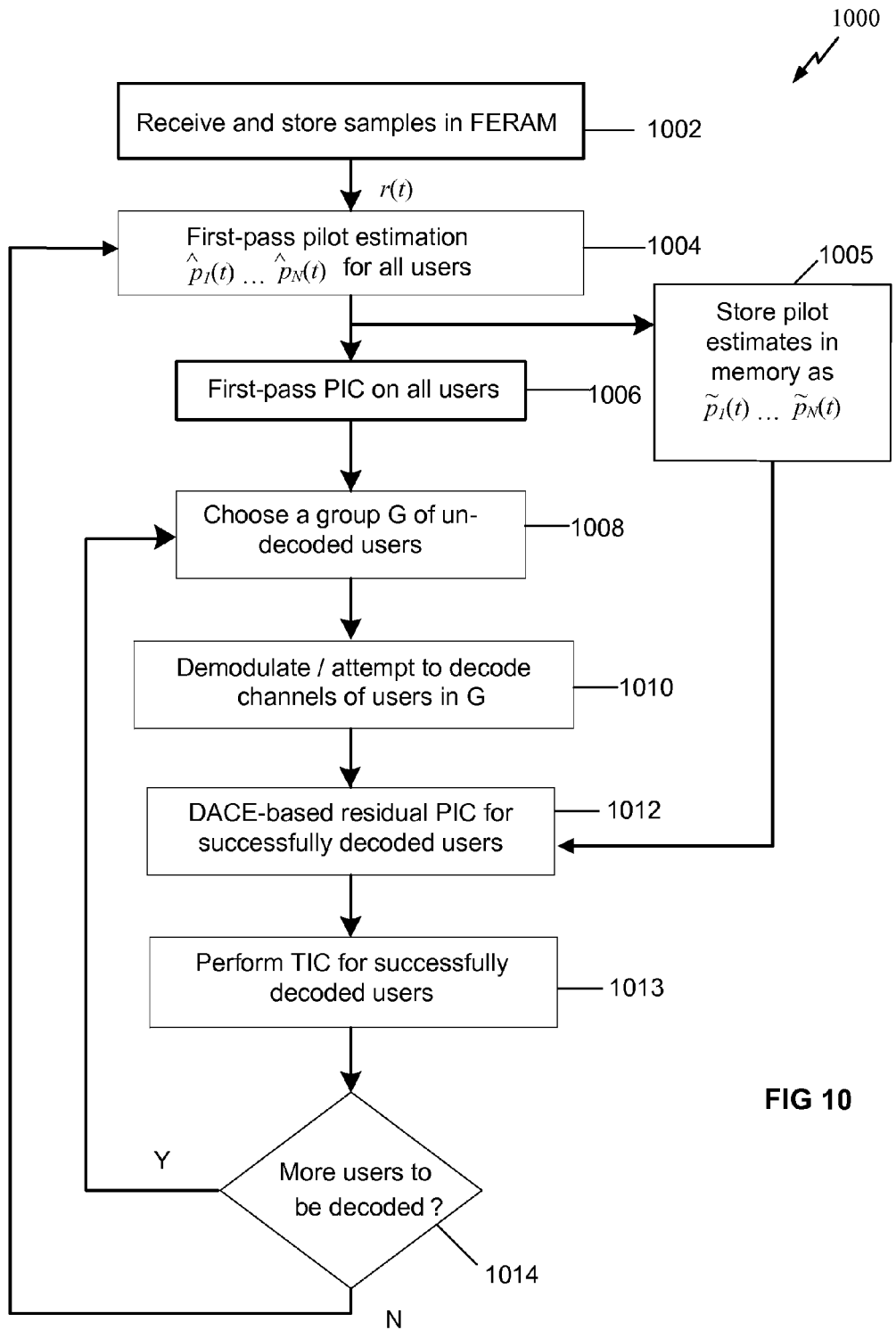
FIG. 10 illustrates a method to perform first-pass PIC, DACE-based residual PIC, and TIC in the receiver of FIG. 9.

FIG. 10 illustrates a method 1000 to perform first-pass PIC, DACE-based residual PIC, and TIC in the receiver 900 of FIG. 9.

At block 1002, samples are continuously received and stored into the FERAM 412.

At block 1004, first-pass pilot estimation is performed for all users. In an exemplary embodiment, the operations performed may be similar to those performed at block 504 in FIG. 5. Pilot estimates $\hat{p}_1(t)$ through $\hat{p}_N(t)$ obtained at this block are stored in a pilot memory 630 at block 1005, and the pilot estimates stored in memory are denoted $\tilde{p}_1(t)$ through $\tilde{p}_N(t)$.

At block 1006, first-pass PIC is performed on all users using the pilot estimates obtained at block 1004.

At blocks 1008-1010, a group of users G is selected and decoded.

At block 1012, DACE-based residual pilot estimation is performed on the samples in the FERAM 412. In an exemplary embodiment, the operations performed at block 1012 may be similar to those performed by block 760 in FIG. 7A, wherein channel estimation is performed using both the pilot and successfully decoded traffic (DACE). In an alternative exemplary embodiment, channel estimation may be performed using only the successfully decoded traffic (DBCE). The difference between the DACE (or DBCE)-based pilot estimates and the first-pass pilot estimates may be cancelled from the samples r(t) in the FERAM 412.

At block 1013, TIC is performed for successfully decoded users by reconstructing the traffic signals based on the decoded data, and cancelling the reconstructed signals from the samples r(t) in the FERAM 412.

At block 1014, it is checked whether there are more users to decode. If yes, the method returns to block 1008, and selects a new group G of users to decode. If no, the method returns to block 1004.

Figure 11:
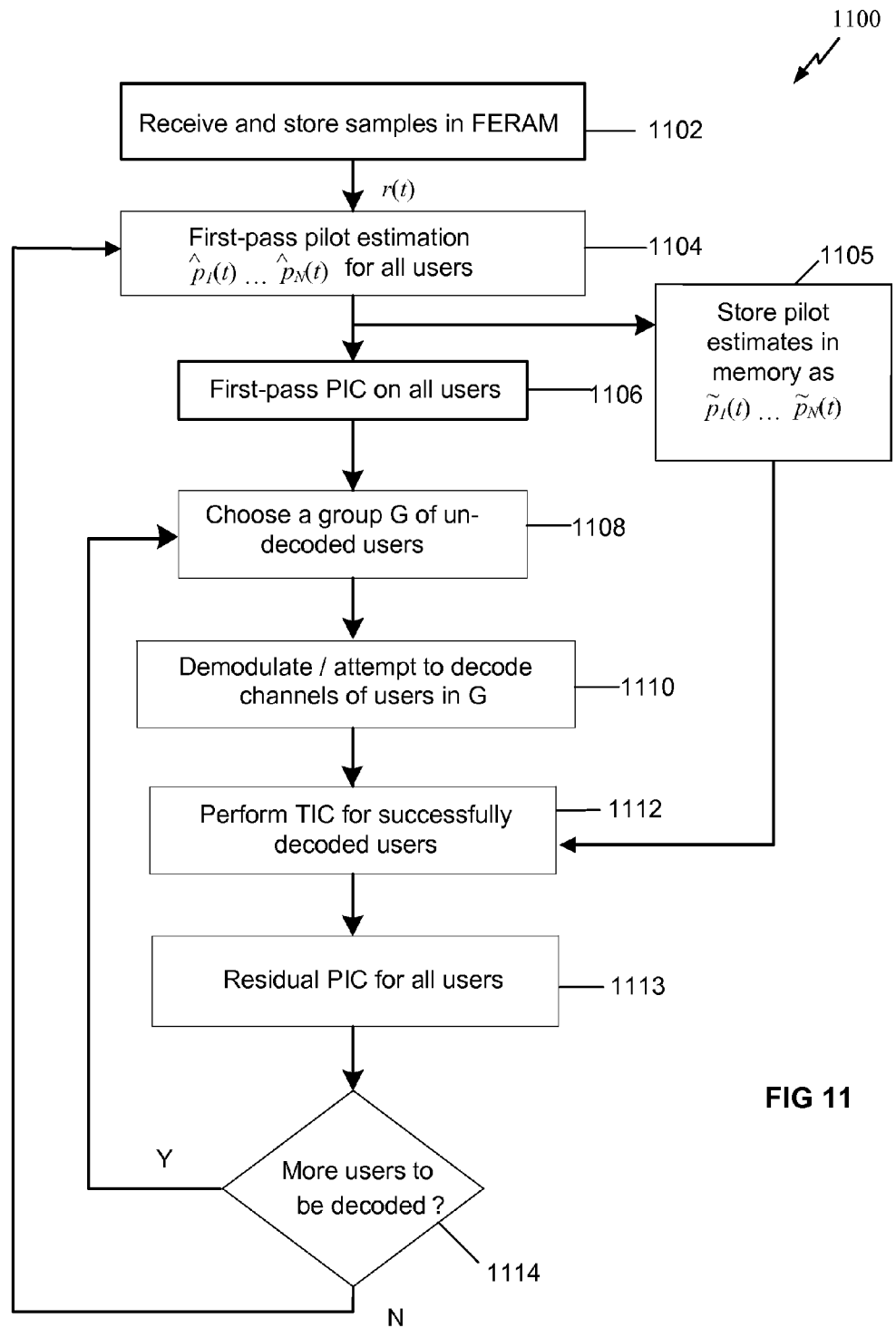
FIG. 11 illustrates a method to perform first-pass PIC, TIC, and residual PIC in the receiver of FIG. 9.

FIG. 11 illustrates a method 1100 to perform first-pass PIC, TIC, and residual PIC in the receiver 900 of FIG. 9.

At block 1102, samples are continuously received and stored into the FERAM 412.

At block 1104, first-pass pilot estimation is performed for all users.

At block 1106, first-pass PIC is performed using the pilot estimates obtained at block 1104.

At blocks 1108-1110, a group of users G is selected and decoded.

At block 1112, TIC is performed for successfully decoded users by reconstructing the traffic signals based on the decoded data, and cancelling the reconstructed signals from the samples r(t) in the FERAM 412.

Figure 11A:
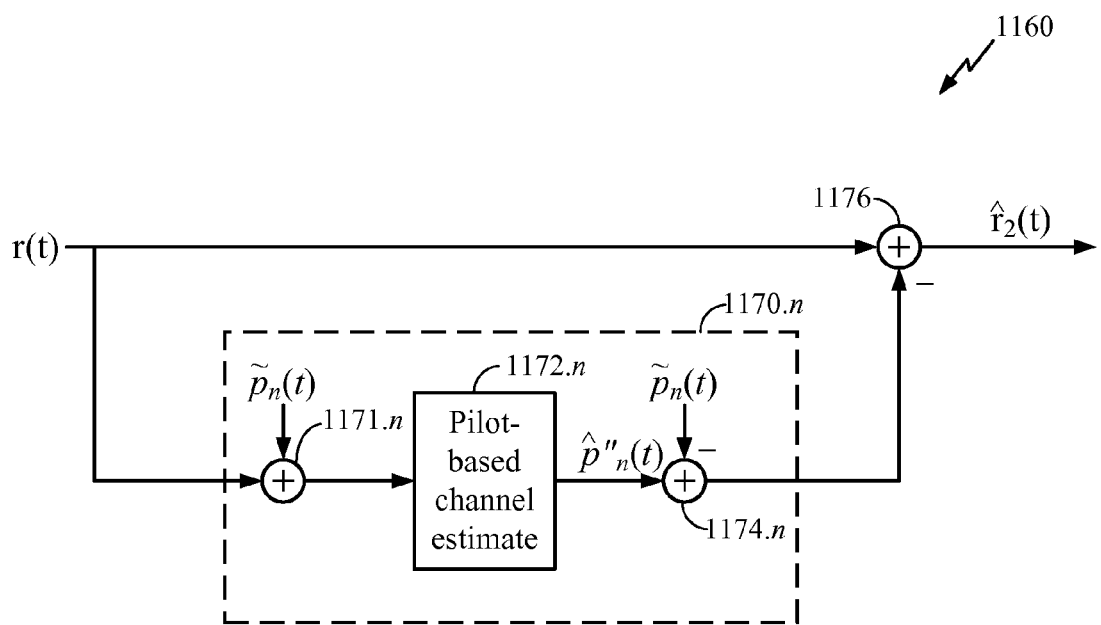
FIG. 11A illustrates an exemplary embodiment of operations performed at a residual PIC block of the method of FIG. 11.

At block 1113, residual PIC is performed for all users on the samples in the FERAM 412. The residual pilot estimates performed at this block benefit from the lesser degree of interference present in the FERAM 412 samples r(t) due to TIC performed at block 1112 in the current iteration, and also to TIC performed at block 1112 in previous iterations of block 1108-1114. In an exemplary embodiment, the operations performed at block 1113 may be based on a pilot only, and may utilize a residual PIC block 1160 shown in FIG. 11A, whose operation will be clear to one of ordinary skill in the art in light of the techniques previously disclosed hereinabove.

At block 1114, it is checked whether there are more users to decode. If yes, the method returns to block 1108, and selects a new group G of users to decode. If no, the method returns to block 11104.

In certain alternative exemplary embodiments, blocks 1008, 1108, along with blocks 1014, 1114, may be configured to perform PIC and TIC for the same user or same group of users more than once in succession. This is known as "iterative" PIC and TIC, and may improve decoding performance as subsequent passes through the decoders may benefit from accumulated cancellation of other users' interference. In such exemplary embodiments, the pilot memory 630 may be further configured to store the most-recently cancelled pilot estimates, rather than only the first-pass cancelled pilot estimates, so that subsequent passes of residual PIC performed at, e.g., block 712 of method 700, may correctly account for pilot estimates already cancelled from samples in the FERAM 412. Such alternative exemplary embodiments are contemplated to be within the scope of the present disclosure.

One of ordinary skill in the art will appreciate that various techniques described hereinabove may be combined to arrive at alternative exemplary embodiments not explicitly illustrated or described. For example, in an alternative exemplary embodiment, the forward PIC techniques described with reference to FIGS. 8 and 8A may be combined with residual PIC and/or TIC techniques described with reference to other figures. Such alternative exemplary embodiments are contemplated to be within the scope of the present disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. A method for processing a composite receive signal, the composite receive signal comprising a first channel and a second channel, the method comprising:
   estimating the first channel to generate a first estimate;
   cancelling the first estimate from the composite receive signal;
   decoding at least a portion of the second channel to generate decoded symbols;
   re-estimating the first channel based at least in part on the decoded symbols to generate a second estimate, wherein re-estimating the first channel is further based at least in part on additional symbols of the second channel received after decoding the portion of the second channel; and cancelling a residual estimate from the composite receive signal, the residual estimate comprising the difference between the first and second channel estimates.

2. The method of claim 1, the first channel comprising a pilot, the second channel comprising data, the estimating of the first channel comprising:
   correlating the composite signal with the pilot; and
   spreading the result of the correlating with the pilot.

3. The method of claim 1, the first channel comprising a pilot, the second channel comprising data, the re-estimating of the first channel comprising:
   correlating the composite signal with the pilot and the decoded symbols; and
   spreading the result of the correlating with the pilot.

4. The method of claim 3, the method further comprising storing the first estimate in a pilot memory, the re-estimating the first channel further comprising:
   adding the first estimate to the composite signal prior to the correlating.

5. The method of claim 1, further comprising weighting the residual estimate with a function of the signal-to-noise ratio associated with the second estimate prior to cancelling the residual estimate from the composite receive signal.

6. The method of claim 1, the composite receive signal further comprising a third channel, the method further comprising:
   reconstructing the second channel based on the decoded symbols to generate a reconstructed second channel;
   cancelling the reconstructed second channel from the composite receive signal; and
   decoding the third channel to further generate decoded symbols.

7. The method of claim 6, the first channel comprising a pilot of a first user, the second channel comprising traffic data of a first user, the third channel comprising traffic data of a second user.

8. The method of claim 6, comprising re-estimating the first channel prior to cancelling the reconstructed second channel from the composite receive signal.

9. A method for processing a composite receive signal, the composite receive signal comprising a first channel and a second channel, the method comprising:
   decoding the second channel to generate decoded symbols;
   estimating the first channel to generate a first estimate;
   cancelling the first estimate from the composite receive signal prior to decoding the second channel;
   estimating the first channel based at least in part on the decoded symbols after decoding the second channel to generate a second estimate; and
   cancelling the second estimate from a portion of the composite receive signal, the portion received after decoding the second channel.

10. The method of claim 9, the estimating the first channel to generate the second estimate further comprising:
    estimating the first channel based on symbols of the second channel received after the decoding of the second channel.

11. The method of claim 9, the estimating the first channel based at least in part on the decoded symbols comprising:
    generating an expected transmit pattern for the second channel received after the decoding of the second channel, the generating the expected transmit pattern comprising re-encoding the decoded symbols; and
    estimating the first channel by comparing the expected transmit pattern for the second channel with the composite receive signal.

12. The method of claim 11, the estimating the first channel based at least in part on the decoded symbols further comprising comparing the expected transmit pattern for the first channel with the composite receive signal.

13. The method of claim 9, the first channel comprising a pilot, the second channel comprising data, the estimating of the first channel based at least in part on the decoded symbols comprising:
    correlating the composite signal with the pilot and the decoded symbols to generate a result, and
    spreading the result with the pilot.

14. The method of claim 9, the second channel formatted as a plurality of frames, the decoding of the second channel comprising decoding a frame of the second channel, the estimating of the first channel based at least in part on the decoded symbols comprising:
    generating an expected transmit pattern for the remainder of the decoded frame; and
    comparing the expected transmit pattern with the composite receive signal.

15. A method for processing a composite receive signal, the composite receive signal comprising a first channel and a second channel, the method comprising:
    estimating the first channel to generate a first estimate;
    cancelling the first estimate from the composite receive signal;
    decoding the second channel to generate decoded symbols;
    reconstructing the second channel based on the decoded symbols to generate a reconstructed second channel;
    cancelling the reconstructed second channel from the composite receive signal;
    re-estimating the first channel after the cancelling the reconstructed second channel to generate a second estimate; and
    cancelling a residual estimate from the composite receive signal, the residual estimate comprising the difference between the first and second channel estimates,
    wherein the second channel is formatted as a plurality of frames, wherein decoding the second channel comprises decoding a first frame of the plurality of frames, and wherein re-estimating the first channel comprises:
       generating an expected transmit pattern for a remainder of the first frame; and
       comparing the expected transmit pattern with the composite receive signal.

16. The method of claim 15, the first channel comprising a pilot pattern, the re-estimating of the first channel comprising correlating the composite receive signal with the pilot pattern.

17. A method for processing a composite receive signal, the composite receive signal comprising a first channel and a second channel, the method comprising:
    estimating the first channel to generate a first estimate;
    cancelling the first estimate from the composite receive signal;
    decoding the second channel to generate decoded symbols;
    reconstructing the second channel based on the decoded symbols to generate a reconstructed second channel;
    cancelling the reconstructed second channel from the composite receive signal;
    re-estimating the first channel after the cancelling the reconstructed second channel to generate a second estimate, the re-estimating based at least in part on the decoded symbols; and
    cancelling a residual estimate from the composite receive signal, the residual estimate comprising the difference between the first and second channel estimates, wherein the first channel comprises a pilot, wherein the second channel comprises data, and wherein re-estimating the first channel is further based at least in part on:
correlating the composite receive signal with the pilot and the decoded symbols to generate a result; and
spreading the result with the pilot.

18. An apparatus for processing a composite receive signal, the composite receive signal comprising a first channel and a second channel, the apparatus comprising:
a decoder configured to early decode at least a portion of the second channel to generate decoded symbols;
a channel estimator configured to estimate the first channel based on the first channel to generate a first estimate, the channel estimator further configured to estimate the first channel based at least in part on decoded symbols of the second channel to generate a second estimate; and
a canceller configured to cancel the first estimate from the composite receive signal prior to decoding the second channel, and to cancel the second estimate from the composite receive signal after decoding at least the portion of the second channel,
wherein the channel estimator is further configured to generate an expected transmit pattern for a remainder of the second channel received after decoding the portion of the second channel by re-encoding the decoded symbols and is further configured to estimate the first channel by comparing the expected transmit pattern with the composite receive signal.

19. An apparatus for processing a composite receive signal, the composite receive signal comprising a first channel and a second channel, the apparatus comprising:
means for early decoding at least portion of the second channel to generate decoded symbols;
means for estimating the first channel based on decoded symbols of the second channel to generate a first channel estimate; and
means for cancelling the first channel estimate from the composite receive signal after decoding the second channel,
wherein the means for estimating comprises:
means for generating an expected transmit pattern for a remainder of the second channel received after decoding the portion of the second channel by re-encoding the decoded symbols; and
means for estimating the first channel by comparing the expected transmit pattern with the composite receive signal.

20. A computer-readable tangible storage medium storing instructions executable by a computer to process a composite receive signal, wherein the composite receive signal comprises a first channel and a second channel, the instructions including:
instructions executable by the computer to decode at least a portion of the second channel to generate decoded symbols;
instructions executable by the computer to estimate the first channel to generate a first estimate;
instructions executable by the computer to cancel the first estimate from the composite receive signal prior to decoding the portion of the second channel;
instructions executable by the computer to estimate the first channel based at least in part on the decoded symbols after decoding the portion of the second channel to generate a second estimate;
instructions executable by the computer to generate an expected transmit pattern for a remainder of the second channel received after decoding the portion of the second channel by re-encoding the decoded symbols;
instructions executable by the computer to estimate the first channel by comparing the expected transmit pattern with the composite receive signal; and
instructions executable by the computer to cancel the second estimate from the composite receive signal.

* * * * *